(12) United States Patent
Hagiwara

(10) Patent No.: US 10,324,972 B2
(45) Date of Patent: Jun. 18, 2019

(54) TAG MANAGEMENT SYSTEM, TAG MANAGEMENT METHOD, INFORMATION PROVISION SYSTEM, AND INFORMATION PROVISION METHOD, AS WELL AS DEVICES AND TAG USED THEREFOR

(71) Applicant: AQUABIT SPIRALS INC., Tokyo (JP)

(72) Inventor: Tomohiro Hagiwara, Tokyo (JP)

(73) Assignee: AQUABIT SPIRALS INC., Tokyo (JP)

( * ) Notice: Subject to any disclaimer, the term of this patent is extended or adjusted under 35 U.S.C. 154(b) by 325 days.

(21) Appl. No.: 15/125,600

(22) PCT Filed: Mar. 13, 2015

(86) PCT No.: PCT/JP2015/057501
§ 371 (c)(1),
(2) Date: Sep. 13, 2016

(87) PCT Pub. No.: WO2015/137490
PCT Pub. Date: Sep. 17, 2015

(65) Prior Publication Data
US 2017/0006027 A1   Jan. 5, 2017

(30) Foreign Application Priority Data

Sep. 13, 2013 (JP) .................... 2014-050904
Feb. 17, 2015 (JP) .................... 2015-029063

(51) Int. Cl.
*G06F 16/38* (2019.01)
*G06F 16/955* (2019.01)
(Continued)

(52) U.S. Cl.
CPC ........ *G06F 16/381* (2019.01); *G06F 16/9554* (2019.01); *G06K 7/10297* (2013.01);
(Continued)

(58) Field of Classification Search
CPC ............ G06F 17/30725; G06F 16/381; G06F 2212/178
See application file for complete search history.

(56) References Cited

U.S. PATENT DOCUMENTS

| | | | |
|---|---|---|---|
| 8,626,135 B1 * | 1/2014 | Schilit ................. | G06Q 20/123 455/414.1 |
| 10,169,796 B2 * | 1/2019 | Hoffman ................ | G06Q 30/02 |
| 2003/0120745 A1 * | 6/2003 | Katagishi ............... | H04L 29/06 709/217 |
| 2005/0198095 A1 * | 9/2005 | Du ....................... | G06Q 10/087 709/200 |
| 2006/0020513 A1 * | 1/2006 | Nagano .................. | G06Q 30/02 705/14.4 |

(Continued)

FOREIGN PATENT DOCUMENTS

| | | |
|---|---|---|
| JP | 005-166071 | 6/2005 |
| JP | 2007-128346 | 5/2007 |

(Continued)

OTHER PUBLICATIONS

"Tackling an RFID Information Distribution Platform," pp. 28-31 in Japanese with 6 pp. of English translation, NTT Communications, NTT Giyyutsu Journal, vol. 18, No. 8, Aug. 1, 2006.

*Primary Examiner* — Thaddeus J Plecha
(74) *Attorney, Agent, or Firm* — Juan Carlos A. Marquez; Marquez IP Law Office, PLLC

(57) ABSTRACT

An operation terminal (120) requires an input of an authentication code when an authority granting request for corresponding electronic information to a tag (100) is received from a user, and transmits the authentication code to a server together with the authority granting request. The server (140) has an authentication code memory unit (142) that stores the authentication code for each tag, and an authorized user management unit (144) that manages the authorized user for each tag. In the case where an authority granting (Continued)

request and an authentication code are received from the operation terminal (120), the server (140) registers the user of the operation terminal (120) with the authorized user management unit (144) as an authorized user of the tag (100) under the conditions that an authorized user of the tag (100) is not registered with the authorized user management unit (144) and the received authentication code matches the contents of the authentication code memory unit (142).

9 Claims, 13 Drawing Sheets

(51) Int. Cl.
 *G06Q 30/02* (2012.01)
 *G06K 7/10* (2006.01)
 *G06Q 30/06* (2012.01)
 *H04L 29/06* (2006.01)

(52) U.S. Cl.
 CPC ......... *G06Q 30/02* (2013.01); *G06Q 30/0609* (2013.01); *G06Q 30/0623* (2013.01); *H04L 63/083* (2013.01); *H04L 63/0853* (2013.01); *H04L 63/101* (2013.01); *G06F 2212/178* (2013.01)

(56) References Cited

U.S. PATENT DOCUMENTS

| | | |
|---|---|---|
| 2007/0051816 A1 | 3/2007 | Chu |
| 2008/0272882 A1 | 11/2008 | Numano et al. |
| 2013/0059534 A1 | 3/2013 | Sobalvarro et al. |
| 2013/0132292 A1 | 5/2013 | Lamb et al. |
| 2013/0134213 A1* | 5/2013 | Pallakoff ................ G06Q 30/00 235/375 |
| 2015/0262157 A1 | 9/2015 | Chihara |

FOREIGN PATENT DOCUMENTS

| | | |
|---|---|---|
| JP | 2010-170520 | 8/2010 |
| JP | 2013-161097 | 8/2013 |
| KR | 2003-0073453 | 9/2003 |
| KR | 1007291830000 | 6/2007 |
| KR | 1008393560000 | 6/2008 |
| WO | WO2011089712 A1 | 7/2011 |
| WO | WO2014057645 A1 | 4/2014 |

\* cited by examiner

FIG.3

| Display ID (Tag ID) | Product ID | URL | ..... |
|---|---|---|---|
| ⋮ | ⋮ | ⋮ | ⋮ |

FIG.9A (a) Authentication code management table

| Tag ID | Authentication code |
|--------|---------------------|
| T00001 | XXXX-XXXX |
| T00002 | YYYY-YYYY |
| ⋮ | ⋮ |

FIG.9B (b) ID correspondence management table

| Tag ID | Chip ID |
|--------|---------|
| T00001 | C00001 |
| T00002 | C00002 |
| ⋮ | ⋮ |

FIG.9C (c) Authorized user management table

| Tag ID | User ID |
|---|---|
| T00001 | USER1 |
| T00002 | USER1 |
| ⋮ | ⋮ |

FIG.9D (c) Provided URL management table

| Tag ID | URL |
|---|---|
| T00001 | http://www.xxx.yyy |
| T00002 | http://www.xxx.zzz |
| ⋮ | ⋮ |

FIG.12

Location management
table

| Tag ID | Location information |
|---|---|
| T00001 | 35.670, 139.750 |
| T00002 | 35.670, 139.750 |
| ⋮ | ⋮ |

TAG MANAGEMENT SYSTEM, TAG MANAGEMENT METHOD, INFORMATION PROVISION SYSTEM, AND INFORMATION PROVISION METHOD, AS WELL AS DEVICES AND TAG USED THEREFOR

This U.S. National Stage claims priority to PCT Application PCT/JP2015/057501 filed on Mar. 13, 2015, which claims priority to the JP Application No. 2014-050904 filed on Mar. 13, 2014; and JP Application No. 2015-029063 filed on Feb. 17, 2015. The entire content of each of the above-identified priority applications is incorporated herein by reference.

TECHNICAL FIELD

The present invention relates to a technology for providing information relating to the image displayed on a display to a user by means of a user terminal.

The present invention also relates to a technology for managing the correspondence of electronic information to tags.

BACKGROUND ART

In recent years, product information provision systems have been examined, wherein a tag that stores in a readable manner information used for acquiring the information relating to a product is provided so as to correspond to an advertisement or a sample of the product, and the information concerning the product is supplied to a user who is interested in the product by means of a user terminal having a function of reading out the information stored in the tag.

In such a product information provision system, a user terminal reads out the information stored in a tag, and the information concerning the product is acquired and outputted so as to be displayed on the basis of the read out information, and thus, the user can be supplied with the information concerning a desired product.

For example, Patent Literature 1 discloses a configuration for setting a tag for each product poster within a panel, wherein the tag stores the location ID for the product poster and the address information for accessing an information management server, and a number of product posters are pasted to (or images of product posters are displayed on) the panel.

Patent Literature 2 discloses a configuration having a server that stores the correspondence between the tag IDs (individual identification numbers) in tags (RFID) and the actions and a personal computer for instructing the server how the tags and the actions correspond to each other, wherein the server registers a tag on the basis of the instruction from the personal computer prior to the correspondence between the tag and an action.

PRIOR ART DOCUMENTS

Patent Documents

Patent Document 1: Japanese Unexamined Patent Publication 2013-161097

Patent Document 2: Japanese Unexamined Patent Publication 2010-170520

SUMMARY OF THE INVENTION

Problem to be Solved by the Invention

In the above-cited Patent Literature 1, the same number of tags as the number of product posters within a panel is required.

In addition, the same number of tags as the number of product posters that have been assumed in advance is installed in a panel in advance, and therefore, a case where it is desired to increase the number of product posters must be dealt with by adding a panel.

Next, a configuration where tags are installed so as to correspond to the product images displayed on a display is examined. In this configuration, the user confirms a product image displayed on a display, and then can receive the information concerning the product that is provided by the user terminal. The display is a device that can arbitrarily change the displayed contents, and therefore, the displayed product image can be changed, and information other than the product image can be displayed. In contrast, the information stored in a tag that is installed so as to correspond to the display is fixed, unless there is a special situation such that the display has a function of rewriting tags.

Therefore, there is a concern that the correspondence between the contents displayed on the display and the information stored in a tag becomes inappropriate, and in such a case, there is a possibility that information provided to the user, who had seen the image displayed on the display, might be different from the information desired by the user.

The present invention is provided in view of the above-described situation, and an object (1) of the invention is to propose a technology according to which it is possible to effectively allow one tag to provide information concerning an image displayed on a display by means of a user terminal.

Patent Literature 2 does not disclose any user restrictions on the process for corresponding tags to actions, though it is necessary to register the tags with a server in order to carry out the process.

The process for corresponding tags to actions must be carried out by a user who has legitimate authority, and therefore, it is necessary to prevent a user who does not have legitimate authority from carrying out an illegitimate correspondence process.

Thus, an object (2) of the present invention is to propose a technology according to which it is possible to prevent a process for corresponding tags to information from being carried out improperly.

Means for Solving Problem

In order to achieve object (1), the information provision system according to the present invention is constructed as follows.

The information provision system according to the present invention is provided with: a display for displaying contents indicating information of an object to be provided; a tag installed so as to correspond to a single display; a server that manages the URL of the information of the object to be provided; and a user terminal that displays the information of the object to be provided on the basis of the URL.

The above-described tag has a memory unit that stores a tag ID in such a manner as to be readable by the above-described user terminal.

The above-described display has: a memory unit that stores a display ID uniquely corresponded to the tag ID stored in the above-described tag; a display unit that displays the contents indicating information of an object to be provided; a selection recognition unit that recognizes a selection of the displayed contents by the user; and a transmission unit that transmits the display ID to the above-described server in response to the recognition of the selection.

The above-described user terminal has: a reception unit that receives a URL from the above-described server; an acquisition unit that acquires the information of an object to be provided on the basis of the received URL; a display unit that displays the acquired information of an object to be provided; a reading unit that reads the tag ID from the above-described tag; and a transmission unit that transmits the read tag ID to the above-described server.

The above-described server has: a memory unit that stores display IDs and URLs in such a manner that the display IDs and the URLs correspond to each other; a reception unit that receives a display ID from the above-described display; a reception unit that receives a tag ID from the above-described user terminal; and a transmission unit that transmits the URL corresponded to the display ID to the above-described user terminal in response to the reception of the display ID from the above-described display and the reception of the tag ID uniquely corresponded to the display ID from the above-described user terminal.

This configuration can effectively allow the user terminal to provide information concerning the image on the display by using one tag.

In the information provision system according to the present invention, information of an object to be provided is provided to a user in the following procedure.

In response to a selection of contents displayed on a display by a user, a display ID is transmitted to the server from the display. In response to the operation by the user through which the tag ID stored in the tag that is installed so as to correspond to the display is read by the user terminal, the tag ID is transmitted to the server from the user terminal. In response to the reception of these IDs (display ID and tag ID that uniquely correspond to each other), the server transmits the URL that corresponds to the display ID (the URL of the information of an object to be provided concerning the displayed contents that has been selected by the user) to the user terminal. The user terminal acquires the information of an object to be provided on the basis of the URL that has been received from the server in response to the transmission of the tag ID and displays the acquired information.

Thus, it is required in the information provision system according to the present invention for a user to select the contents displayed on the display and for the tag ID stored in the tag that is installed so as to correspond to the display to be read by the user terminal in order to transmit the URL of the information of an object to be provided to the user terminal from the server.

Thus, in the information provision system according to the present invention, a situation where information that is different from the information desired by a user is provided to the user who saw an image on a display can be prevented from occurring.

Here, the ID is the identification information for uniquely identifying an object (display or tag) to which the ID is attached.

In addition, various techniques can be used to make a display ID and a tag ID uniquely correspond to each other.

For example, the above-described display stores a tag ID that is stored in the memory unit in the above-described tag as the display ID, and as a result, the display ID and the tag ID can be uniquely corresponded.

As another example, the above-described server stores information with which the display ID and the tag ID can be uniquely corresponded, and the display ID and the tag ID are uniquely corresponded on the basis of the information.

In addition, the information provision system according to the present invention may have such a configuration that in the above-described display, the above-described display unit displays a number of pieces of contents, the above-described selection recognition unit recognizes a selection of any of the displayed pieces of contents by a user, and the above-described transmission unit transmits the ID of the selected piece of displayed contents in association with the display ID to the above-described server, and in the above-described server, the above-described memory unit stores the ID of each piece of contents displayed on the above-described display that corresponds to a display ID and the URL of the information of the object to be provided concerning the displayed contents in such a manner that the ID of the piece of displayed contents and the URL correspond to the display ID, the above-described reception unit receives the ID of the displayed contents in addition to the display ID from the above-described display, and the above-described transmission unit transmits the URL that corresponds to the received ID of the displayed contents to the above-described user terminal.

In this configuration, the URL of the displayed piece contents that has been selected by a user from among a number of pieces of contents displayed on a display is transmitted to the user terminal that has read the tag ID stored in the tag that is installed so as to correspond to the display.

Therefore, the user can simply select any piece of contents displayed on the display and allow the user terminal to read the tag ID from the tag that is installed so as to correspond to the display in order to be provided with the desired information concerning the displayed contents. In addition, only one tag can be installed so as to correspond to the display, though the display displays a number of pieces of contents in the configuration. Furthermore, the tag ID stored in a tag can be fixed, though the URL transmitted from the server in response to the piece of displayed contents selected on the display varies in the configuration, and therefore, it is not necessary to provide with the display a mechanism (hardware) for actively rewriting the tag ID in response to the selection of the displayed contents, and thus, a simple system configuration can be provided.

Moreover, the information provision system according to the present invention may have such a configuration that displays and tags that are the same as the above-described display and tag may be installed in a number of different places, and the respective displays are connected to the above-described server via a network.

This configuration makes centralized management of the information provision system that covers a number of bases possible on the server side.

In addition, the information provision system according to the present invention may have such a configuration that the above-described server stores contents indicating information of objects to be provided, and the above-described displays acquire the contents indicating information of an object to be provided from the above-described server and display the acquired information.

This configuration makes centralized management of the contents to be displayed on a display possible on the server side.

Here, the present invention can relate to a server, a tag, a user terminal or a display that are used in the above-described information provision system.

In addition, the present invention can relate to the information provision method that can be implemented in the above-described information provision system.

Furthermore, the present invention can relate to a program for implementing a server, a user terminal or a display to be used in the above-described information provision system by means of a computer, and to a memory medium that stores this program in such a manner as to be readable.

In order to achieve the object (2), the tag management system according to the present invention has the following configuration.

The tag management system according to the present invention is provided with: a tag corresponded to electronic information; an operation terminal operated by a user; and a server that manages an authorized user having authority to correspond electronic information.

The above-described operation terminal has an authority granting request unit that acquires recognition information of a tag when a request to grant the authority to correspond electronic information to the tag is received from the user, and transmits the acquired recognition information to the above-described server together with the above-described granting request.

The above-described server has: a recognition information memory unit that stores the recognition information of each tag; an authorized user management unit that manages the authorized user for each tag; and an authorization granting unit that registers the user of an operation terminal with the above-described authorized user management unit as the authorized user of the tag in the case where a granting request and recognition information are received from the operation terminal under such conditions that no authorized user of the tag concerning the granting request is registered with the authorized user management unit, and the received recognition information of the tag matches the contents of the recognition information memory unit.

Here, the recognition information is the information that is required in the case where the user requests that the authority to correspond electronic information to the tag be granted.

In this configuration, only the authorized user can correspond electronic information to the tag, and furthermore, no other users can be authorized in the case where a user is already authorized. Thus, a number of users can be prevented from being registered as authorized users for a tag, and therefore, other users cannot gain authority to correspond electronic information to the tag for which a user has already been authorized even if they can gain recognition information of the tag, and thus, a process for corresponding electronic information to a tag can be prevented from being carried out improperly.

Here, the chip ID particular to the chip that controls the operation of the tag can be used as the authentication information of a tag. In this case, the chip ID is particular to the chip, and therefore cannot be rewritten even in the case where a copy is made by writing the tag ID that has been read out from a certain tag to another tag. The copy is incomplete because it does not match the contents stored in the server, and therefore, the user cannot be authorized for the copy of the tag. Accordingly, the correspondence cannot be changed with the copy of the tag because the electronic information corresponded to the copy of the tag changes with the change in the correspondence to the original tag. Therefore, in such a situation where the same electronic information is corresponded to a number of tags for use, such effects can be gained that the correspondence to the tags can be changed connectively while preventing the correspondence to a certain tag from being changed without authorization.

In addition, an authentication code that has been corresponded to a tag in advance in such a manner as to be recognizable by the user can be used as the authentication information of the tag. In this case, no problem arises when a tag is installed in such a manner that the authentication code can be easily seen in a place where an unspecified large number of people can visit, such as stores and public places. Here, the authentication code is required to activate a tag to a state where electronic information is corresponded to the tag, that is to say, to a state of being available for access to the electronic information, and therefore, the authentication code may be referred to as an activation code.

Furthermore, the tag management system according to the present invention may have such a configuration that the above-described operation terminal has an authority deletion requiring unit that receives from a user a request for deleting the authority to correspond electronic information to a tag and transmits the request to the above-described server, and the above-described server has an authority deleting unit that deletes the authorized user for the tag from the above-described authorized user management unit under the condition that the user of the operation terminal is registered as an authorized user for the tag concerning the above-described deletion request in the case where the above-described deletion request is received from the above-described operation terminal.

In this configuration, an authorized user for a tag can be changed to another user, which makes it possible for the user that receives the tag to be a new authorized user, and thus, the tags can be used effectively.

Here, the present invention can be implemented as a server, an operation terminal or a tag that are to be used in the above-described tag management system.

Furthermore, the present invention can be implemented as a tag management method that can be used in the above-described tag management system.

Moreover, the present invention can be implemented as a server that is used in the above-described tag management system, a program for allowing an operation terminal to be implemented by a computer, or a memory medium that stores the program in such a manner as to be readable.

Effects of the Invention

The present invention can effectively allow a user terminal to provide information that relates to an image on a display by means of one tag.

In addition, the present invention can prevent a process for correspondence to a tag from being carried out improperly.

BRIEF DESCRIPTION OF THE DRAWINGS

FIG. 3 is a diagram showing an example of the URL management data in the product selling system in the example;

FIGS. 9A through 9D are diagrams showing examples of data stored in and managed by the server in the tag management system in the example;

FIG. 12 is a diagram showing another example of data stored in and managed by the server in the tag management system in the example.

PREFERRED EMBODIMENTS OF THE INVENTION

One embodiment of the present invention is described in reference to the drawings.

Figure 1:
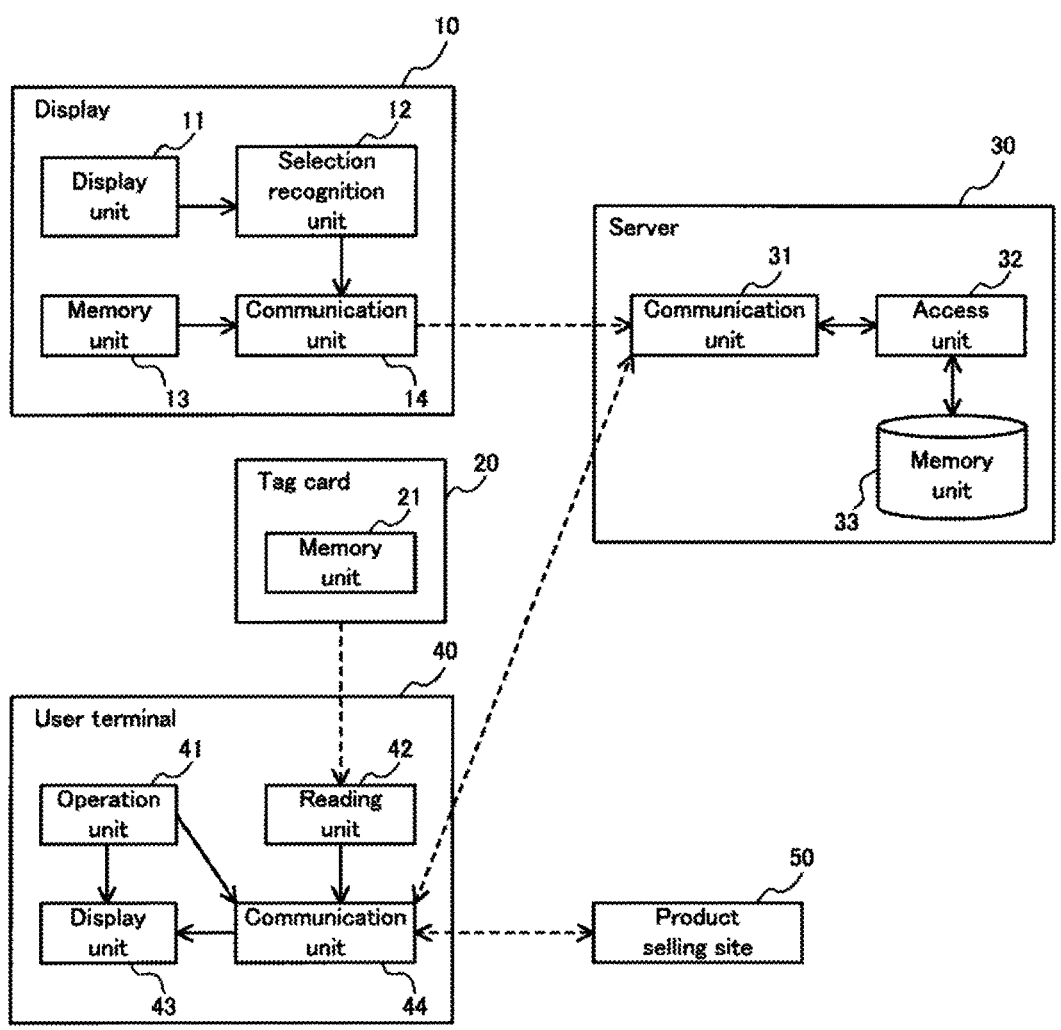
FIG. 1 is a diagram showing the function blocks of a product selling system, which is an example of the information provision system according to the present invention.

FIG. 1 shows function blocks for a product selling system that is an example of the information provision system according to the present invention.

The product selling system in the example is provided with: a display 10 that displays various types of information, including a product image to be sold; a tag card 20 installed so as to correspond to a single display 10; a server 30 that manages the URL of the product selling page (an example of the information on an object to be provided) that corresponds to the product image; a user terminal 40 that displays various types of information, including the product selling page; and a product selling site 50 that provides the product selling page.

Here, the product image is an example of the contents for displaying the product selling page. The contents is not limited to the information for an image as in the example and may be information for letters, videos or a combination of letters, images and videos. Namely, any information that allows a user who sees the display thereof to visually recognize (identify) the information on an object to be provided is possible.

The product selling system in the example is generally operated in the following procedure.

A user selects a product image displayed on the display 10 and allows the user terminal 40 to read the tag ID from the tag card 20 that is installed so as to correspond to the display 10 so that the URL of the product selling page for the selected product image is transmitted to the user terminal 40 from the server 30, and thus, the product selling page on the basis of the URL is acquired by and displayed on the user terminal 40.

Here, the product may be any item (tangible) such as clothing, a bag or an ornament, or may be electronic data (intangible) such as music data, video data or applications.

In addition, various types of images that show the product can be used as the product image. For example, a photo of the product may be used or a schematic depiction of the product may be used.

In the following, the roles, functions and operations of the respective devices are described.

The display 10 is a stationary device having: a display unit 11 that displays various types of information, including a product image; a selection recognition unit 12 that recognizes a selection by the user of a product image displayed on the display unit 11; a memory unit 13 that stores the display ID that is particular to the display and the IDs of the respective product images; and a communication unit 14 that communicates with the server 30.

Here, the display 10 in the example has such a mechanism that the product images to be displayed and their IDs are received from the server 30 so that the product images can be displayed on the display unit 11, and at the same time, the IDs of the product images are stored in the memory unit 13.

The display ID in the example is a piece of information to uniquely identify the individual display 10, and at the same time is corresponded 1:1 to the tag ID particular to the tag card 20 that is installed so as to correspond to the display 10. The correspondence between the display ID and the tag ID may be established by allowing the server 30 to manage the information with which the display ID and the tag ID are uniquely corresponded to each other, or by using the same ID for the display ID of the display 10 and the tag ID of the tag card 20 that is installed so as to correspond to the display 10 (that is to say, by allowing the display 10 to store the tag ID as the display ID).

In addition, the ID of a product image is the information that uniquely identifies the product image displayed on the display 10, and at the same time is the information that specifies the URL of the product selling page concerning the product.

Product IDs that can uniquely identify the respective products can be used as the IDs of product images, for example. In this case, the correspondence between the product IDs of the products of which the images are to be displayed on the respective displays 10 and the URLs of the product selling pages for the products may be managed by the server 30.

As another example, the location ID that indicates the location of a product image displayed on the display 10 can be used as the ID of the product image. In this case, the correspondence between the location IDs that indicate the locations of the respective displays 10 and the URLs of the product selling pages for the products of which the images are displayed in these locations may be managed by the server 30.

As still another example, the URL of the product selling page for a product of which the image is displayed on the display 10 can be used as the ID of the product image.

The display 10 is installed in an arbitrary place where communication with the server 30 is possible. That is to say, the display 10 can be installed not only in a store of a company that operates the product selling system, but also in a store of other companies such as a convenience store or a supermarket, an event venue or a rented space within the premise of a station. It is preferable to install the display 10 in a place that can attract a great number of people.

The display 10 displays one or a number of product images in such a manner as to be selectable by a user.

In the example, a touch panel device that can detect a touching operation on the display unit 11 by a user is used as the display 10, which has such a mechanism that the selection recognition unit 12 recognizes the selection by a user of a product image in response to the detection of a user touching the product image displayed on the display unit 11.

The recognition of the selection of a product image by the selection recognition unit 12 may be achieved in accordance with another technique. For example, a number of operation buttons may be provided on the display 10 so as to correspond to the locations where the respective product images are displayed. In response to an operation button being pressed down, it may be recognized that the product image has been selected in the location that corresponds to the operation button. As another example, an operation device such as a mouse that operates the cursor displayed on the screen may be connected to the display 10 so that the selection of a product image can be recognized in response to the clicking operation in a state where the cursor is placed on the product image.

The display 10 may always display a product image or may start the display of a product image through the instruction by a user. For example, information that can easily attract people close by (campaign information, for example) may be displayed regularly, and the display may be switched to that of a product image in response to any operation (touch operation, for example) on the display 10. As another example, the display 10 may be regularly turned off, and the display may recover from the off state to display a product image in response to any operation (touch operation, for example) on the display 10.

In the case where there is one product image to be displayed, the display 10 can recognize the operation that triggers the display of the product image (an operation for switching the display of other information to the display of the product image, or an operation for recovering the display from the off state to display the product image, and the like) as the tacit selection by the user of the product image. The operation of selecting a product image after the product image has been displayed on the display 10 may be recognized as the selection by the user of the product image.

In the case where there are a number of product images to be displayed, the display 10 can recognize the operation for selecting any of the product images as the selection of the product image by the user.

In response to the recognition of the selection of a product image as described above, the display 10 transmits its own display ID and the ID of the selected product image to the server 30 with these IDs being associated with each other. In the case where there is one product image to be displayed on the display 10, the ID of the product image can be specified uniquely from the display ID, and therefore, the transmission of the ID of the product image may be omitted.

A tag card 20 that is corresponded 1:1 to the display 10 is installed in the display 10. In the case where there are a number of displays 10, one tag card 20 is installed in each display 10. In other words, a tag card 20 is installed so as to correspond to a single display 10.

Though a tag card 20 is installed in the vicinity of the display 10 in the example, the installment may be done in another manner such as pasting a tag card 20 to a display 10, and may be done in any manner as long as the user can visually understand the correspondence between the display 10 and the tag card 20.

The tag card 20 is a medium having the memory unit 21 that stores the tag ID particular to the tag in such a manner as to be readable by the user terminal 40, and a card to which a ready-made tag that has at least stored the tag ID in advance is attached can be used as the tag card 20.

In the example, a card to which an NFC (near field communication) tag, which is a type of electronic tag for transmitting data in non-contact communication, is pasted (or incorporated) is used as the tag card 20, and a card to which another electronic tag such as an RFID tag is pasted may be used. In addition, a type of card on which a pattern image such as a one-dimensional or two-dimensional bar code that is gained by converting data to an image is printed (or to which a printed material thereof is pasted), or a type of card that uses Bluetooth (registered trademark), WiFi (registered trademark) or high frequency sound may be used as the tag card 20. Furthermore, a number of different types of tag IDs may be stored in the tag card 20, taking into consideration that there could be a case where the reading functions are different depending on the type of user terminal 40.

The user terminal 40 is a portable device having an operation unit 41 that is operated by the user, a reading unit 42 that reads the tag ID from the tag card 20, a display unit 43 that displays various types of information including a product selling page, and a communication unit 44 that communicates with the server 30 or the product selling site 50.

Any of the various types of terminals such as portable phones, including smart phones, tablets and other mobile terminals, can be used as the user terminal 40.

The reading unit 42 in the user terminal 40 can be implemented in any of the various types of modes. For example, it can be implemented as a device having a function of reading data transmitted from the electronic tag attached to the tag card 20 when the user terminal 40 comes close to and is within the communication range of the tag card 20, or a function of reading data by taking a picture of the pattern image attached to the tag card 20 with a camera and by analyzing the pattern image, or the user terminal may have a number of reading functions as these.

The user terminal 40 transmits the tag ID to the server 30 in response to the fact that the tag ID has been read from the tag card 20 and receives the URL of the product selling page that is transmitted from the server 30 in response to the transmission of the tag ID. In addition, the user terminal 40 accesses the product selling site 50 that is indicated by the URL for the product selling page in response to the reception of the URL for the product selling page from the server 30, and thus acquires the product selling page from the product selling site 50. Furthermore, the user terminal 40 displays as the output the product selling page acquired from the product selling site 50 on the display unit 43.

In the example, the address information (information such as the URL or IP address) of the server 30 to which a tag ID is to be transmitted is stored in the tag card 20 in advance, and the user terminal 40 reads the address information of the server 30 together with the tag ID from the tag card 20 and transmits the tag ID to the server 30 on the basis of the address information. Here, the user terminal 40 may have the address information of the server 30 in advance so that the tag ID can be transmitted to the server 30 on the basis of the address information.

Figure 2:
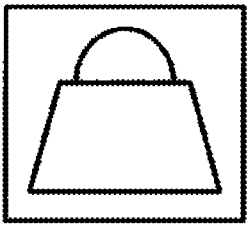
FIG. 2 is a diagram showing an example of a product selling page in the product selling system in the example.

FIG. 2 shows an example of a product selling page displayed on the user terminal 40. The product selling page in the figure is formed of components including the display of detailed information of a product (product name, price and the like), the input portions for the information that is required when a product is purchased (color and quantity of the product, name, address and contact information of the user, desired date of delivery, payment method and the like), the submit button to confirm the purchase of the product, and the like.

As a result, the user can input the information required for the purchase of a product on the product selling page displayed on the user terminal 40 through the operation of the operation unit 41 so that the user can purchase the desired product (selected from the images on the display 10).

The server 30 has a communication unit 31 that communicates with the display 10 and the user terminal 40, a memory unit 33 that stores the correspondences between the display ID, the product image ID and the URL, and an access unit 32 that accesses the memory unit 33.

The server 30 may be formed as a single device or a number of devices connected to each other so that communication is possible between the devices.

Figure 3:
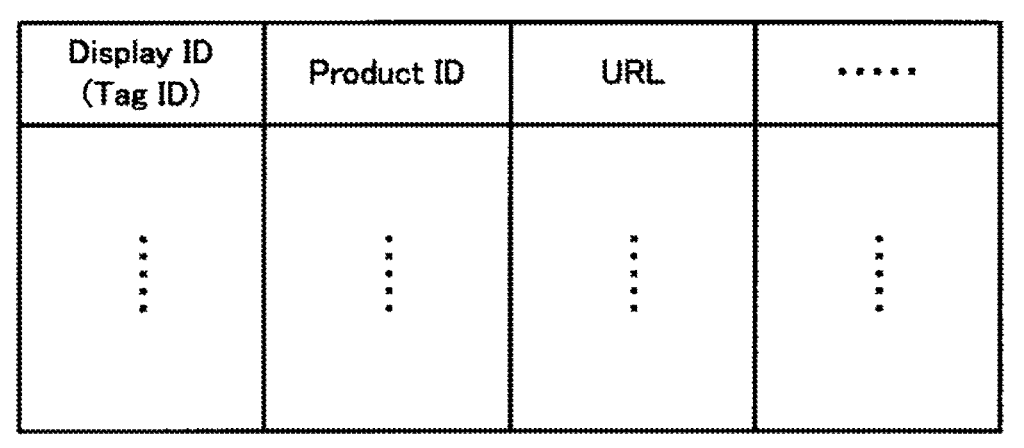

FIG. 3 shows an example of the data stored in the memory unit 33.

This figure shows the URL management data where the display IDs of the displays 10 within the product selling system, the product IDs of the products of which the images are displayed on the displays 10, and the URLs of the product selling pages for the products are corresponded to each other. In addition, the memory unit 33 in the example stores product images that are corresponded to the product IDs so as to provide a system where a product image is transmitted to and displayed on the display 10. Here, other information such as the product names and brief explanations of the products is also stored in addition to the product images so as to be transmitted to a display 10 and displayed together with the product image.

In the example in FIG. 3, the same ID is added as the display ID of a display 10 and as the tag ID of the tag card 20 that is installed so as to correspond to the display 10.

The use of the URL management data allows the server 30 to specify a product image and the display 10 on which the user has selected the product image when the display ID transmitted from the display 10 and the product image ID (product ID, for example) are received. As a result, the server 30 can prepare to transmit the URL of the product selling page concerning the product image selected on the display 10 to the user terminal 40 that has read the tag ID from the tag card 20 installed so as to be corresponded to the display 10.

Thus, a product image can be selected on a display 10 so as to set the correspondence between the display ID of the display 10 and the URL of the product selling page concerning the product image selected on the display 10. Here, the display ID of the display 10 and the tag ID of the tag card 20 that is installed so as to correspond to the display 10 are uniquely corresponded, and therefore, it can be said that the correspondence with the URL of the product selling page concerning the product image selected on the display 10 has been set to the tag ID.

The correspondence between the display ID and the URL of the product selling page can be implemented in various types of modes. For example, it can be implemented in a mode where a flag indicating that the correspondence has been set is attached to the corresponding URL management data, or in a mode where data indicating the correspondence between the display ID and the URL of the product selling page is generated.

After the correspondence between the display ID and the URL of the product selling page has been set, the server 30 transmits the URL of the product selling page, which is corresponded to the display ID that uniquely corresponds to the tag, to the user terminal 40 that has transmitted the tag ID of the tag card 20 in response to the reception of the tag ID from the user terminal 40.

That is to say, the server 30 transmits the URL that is corresponded to the display ID to the user terminal 40 in response to the reception of the display ID from the display 10 and the reception of the tag ID that is uniquely corresponded to the display ID from the user terminal 40.

Figure 4:
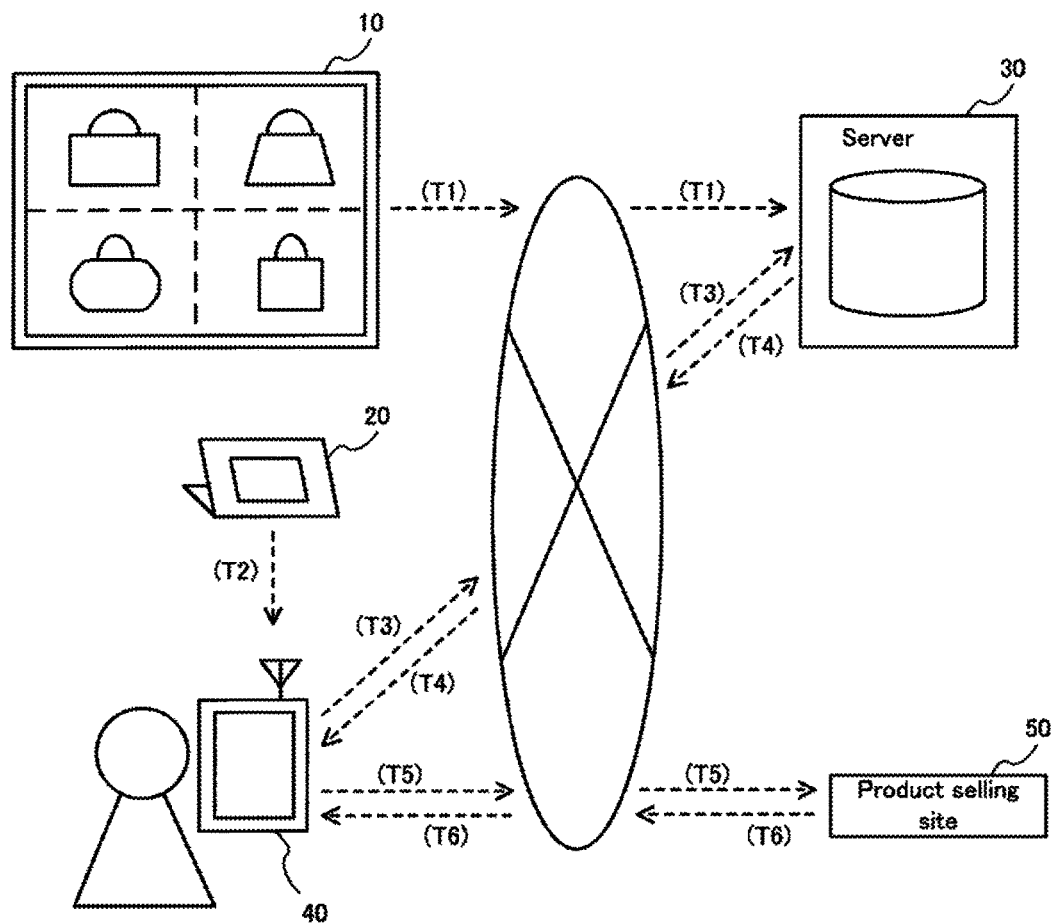
FIG. 4 is a diagram showing the flow of processes in the product selling system in the example.

The flow of the process in the product selling system in the example is described in reference to FIG. 4.

In the example in FIG. 4, a different product image is displayed in each section of the display region that is divided into four sections, two on the left (top and bottom) and two on the right (top and bottom), on the display 10.

A user who desires to purchase a product first touches the display 10 so as to select a product image that is displayed on the display 10.

Upon the recognition of the selection of a product image by the user, the display 10 transmits its own display ID and the ID of the selected product image to the server 30 in such a manner that the display ID and the product image ID are associated with each other (T1).

Upon the reception of the display ID and the product image ID transmitted from the display 10, the server 30 accesses the URL management data in the memory unit 33 on the basis of these IDs and sets the correspondence between the tag ID of the tag card 20 that is installed so as to correspond to the display 10 and the URL of the product selling page concerning the product image selected on the display 10.

After the selection of a product image displayed on the display 10, the user who desires to purchase the product allows the user terminal 40 to read the tag ID of the tag card 20 that has been installed so as to correspond to the display 10 (T2).

When the tag ID of the tag card 20 is read by the reading unit 42, the user terminal 40 transmits the tag ID to the server 30 (T3).

Upon the reception of the tag ID transmitted from the user terminal 40, the server 30 accesses the URL management data in the memory unit 33 on the basis of the tag ID and acquires the URL of the product selling page that is corresponded to the tag ID, and then transmits the acquired URL to the user terminal 40 (T4).

Upon reception of the URL of the product selling page from the server 30, the user terminal 40 accesses the product selling site 50 indicated by the URL (T5) and acquires the product selling page from the product selling site 50 (T6) so as to output the product selling page for display.

The user inputs information required for the purchase of the product on the product selling page displayed on the user terminal 40, and thus purchases the desired product.

As described above, in the product selling system in the example, the selection of a product image displayed on the display 10 by a user (transmission of the display ID of a display 10 to the server 30) and the reading of the tag card 20 that has been installed so as to correspond to the display 10 by the user terminal 40 (transmission of the tag ID that has been uniquely corresponded to the display ID to the server 30) are necessary for the transmission of the URL of the product selling page to the user terminal 40 from the server 30 in the configuration.

That is to say, upon the reception of the display ID from the display 10 and the reception of the tag ID that has been uniquely corresponded to the display ID from the user terminal 40, the server 30 transmits the URL that is corresponded to the display ID to the user terminal 40 in the configuration.

As a result, a situation where a user who saw an image of a desired product on a display 10 is provided with a product selling page that is different from the one for the product can be prevented from taking place.

In addition, the configuration does not allow the display 10 to provide a product selling page, and therefore, the period of time when one user uses a display 10 exclusively can be shortened.

Furthermore, the configuration allows the user terminal 40 that is owned by a user to provide a product selling page, and therefore, the user can proceed with the purchase of a product without worrying about other users.

Moreover, in the product selling system in the example, the URL of the product image selected by the user from among a number of product images displayed on the display 10 is transmitted to the user terminal 40 that has read the tag ID stored in the tag card 20 that has been installed so as to correspond to the display 10 in the configuration.

Thus, the user selects any of the product images displayed on the display 10 and simply allows the user terminal 40 to read tag ID from the tag card 20 installed so as to correspond to the display 10 in order for the user to be provided with a product selling page concerning the desired product.

In addition, only one tag card 20 that is installed so as to correspond to the display 10 is sufficient, though the configuration allows a number of product images to be displayed on the display 10.

Though the URL transmitted from the server 30 is different depending on the product image selected on the display 10 in the configuration, the tag ID stored in the tag card 20 is fixed, and therefore, it is not necessary for the display 10 to be provided with a mechanism (hardware) for actively rewriting the tag ID in response to the selection of the product image, and thus, the system can have a simple configuration.

Though a different product image is displayed in each section of the display region that is divided into a number of sections on the display 10 in the above-described example, the display 10 may display a number of product images by switching the display of a product image with an instruction from the user or as time elapses.

In this case, the display 10 recognizes the operation of selecting a product image on the display as the selection of the product image by the user. Alternatively, the switching of the display of a product image may be recognized as a tacit selection of the product image by the user.

Figure 5:
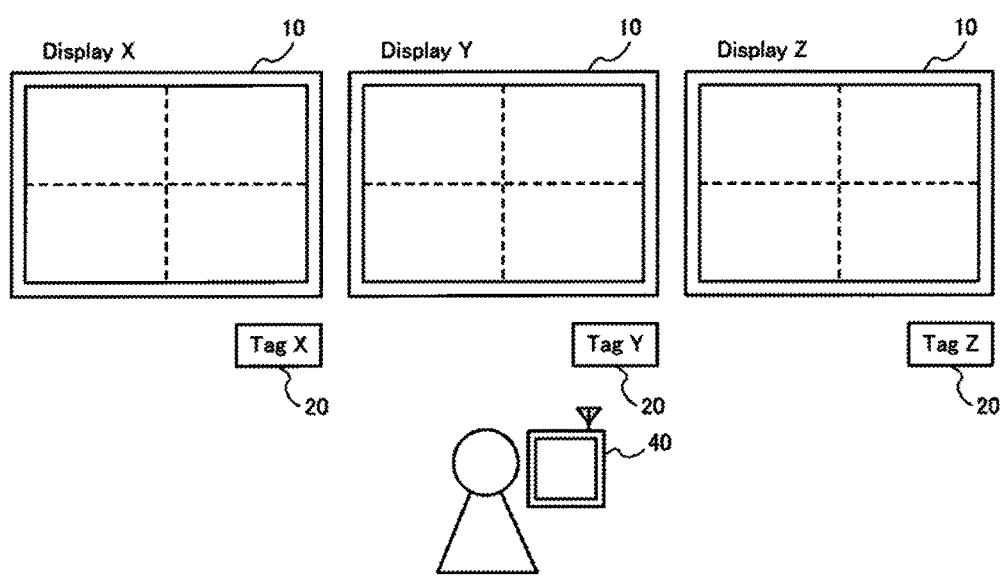
FIG. 5 is a diagram showing an example where displays and tag cards are installed in the product selling system in the example.

FIG. 5 shows an example of how displays 10 and tag cards 20 are installed in the product selling system in the example.

In the figure, three displays 10, a display X, a display Y and a display Z are arranged side by side, and at the same time, three tag cards 20, a tag X, a tag Y and a tag Z are provided in front of the corresponding display 10. Though the displays 10 and the tag cards 20 are placed at a slight distance away from each other, the corresponding display 10 and tag card 20 are placed in proximity to each other so that the user can easily recognize the correspondence between each display 10 and each tag card 20.

Each display 10 transmits its own display ID and the ID of the selected product image to the server 30 in such a manner that the display ID and the product image ID are associated with each other in response to the fact that a product image on the display 10 has been selected by a user.

As a result, the server 30 can specify which product image has been selected on which display 10 on the basis of the display ID and the product image ID received from the display 10. Thus, the server 30 can correspond the URL of the product selling page concerning the selected product image to the tag ID of the tag card 20 that has been installed so as to be corresponded to the display 10 on which the product image has been selected.

Furthermore, the displays 10 and the tag cards 20 are not physically connected to each other in the example, and it is visually clear in the configuration that the rewriting of the tag card 20 linked to the selection of a product image on the display 10 is impossible. However, an operation is achieved in such a manner that the tag card 20 looks like it has been rewritten.

In the case where a number of displays 10 that display different product images are arranged side by side, the user can see a number of product images at the same time. In the case where a number of displays 10 that display the same product image are arranged side by side, a number of users can access the product selling page at the same time.

When the display 10 displays a number of product images and the display region on one screen is not sufficient, the respective product images may be dispersed on a number of screens so that the display on each screen can be switched in response to the instruction by the user. In this case, it can be specified which product image has been selected by transmitting the screen ID that identifies the screen together with the location ID when the location ID that indicates the display location on the display 10 is transmitted as the product image ID.

Figure 6:
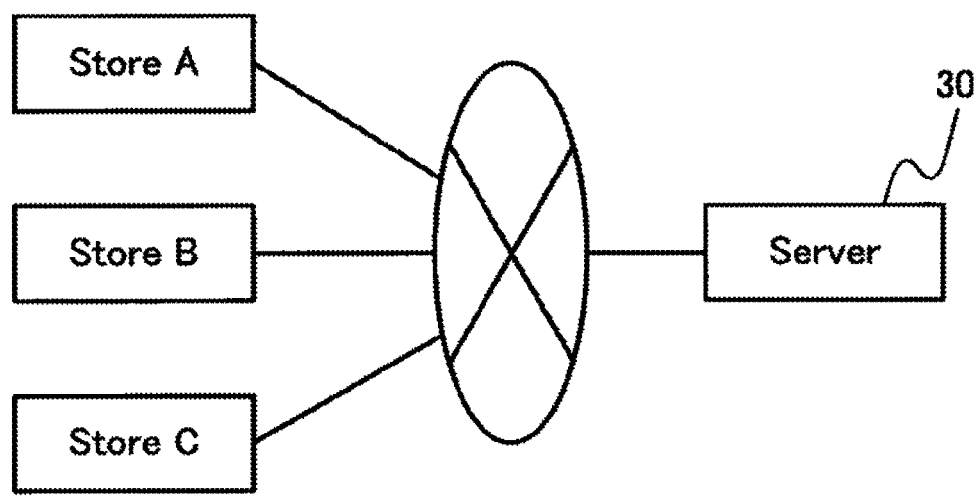
FIG. 6 is a diagram showing an example of the network configuration of the product selling system in the example.

FIG. 6 shows an example of a network configuration of the product selling system in the example.

In the figure, three stores, a store A, a store B and a store C, are connected to a server 30 through network lines. In each store, a display 10 and a tag card 20 are installed so as to correspond to each other, and the respective display devices 10 can communicate with the server 30 through the network lines.

Thus, a display 10 and a tag card 20 may be installed in a number of different places, and the respective displays 10 may be connected to the server 30 through network lines in the configuration. As a result, the displays 10 and the tag cards 20 that are installed in different locations can be collectively managed on the server's side.

In the product selling system in the example, the displays 10 are formed of a computer having hardware resources including: a CPU (central processing unit) that carries out various types of operations; a main memory device made of a RAM (random access memory) that provides a region where the CPU operates and a ROM (read only memory) for recording a basic control program, and the like; an auxiliary memory device for storing various types of programs and data; a display for outputting various types of information for display; an input/output I/F, which is an interface with the input device such as an operation button or a touch panel used by the operator for the input operation; and a communication I/F, which is an interface for wire or wireless communication vis-à-vis other devices.

Thus, the computer is made to run a program concerning the display according to the present invention so that the respective functions of the display according to the present invention can be implemented in and on the computer.

In the display 10 in the example, the memory unit 13 corresponds to the memory unit in the display according to the present invention, the display unit 11 corresponds to the display unit in the display according to the present invention, the selection recognition unit 12 corresponds to the selection recognition unit in the display according to the present invention, and the communication unit 14 corresponds to the transmission unit in the display according to the present invention.

Likewise, the server 30 is formed of a computer having various types of hardware resources with which the computer is made to run a program concerning the server according to the present invention so that various types of functions in the server according to the present invention can be implemented in and on the computer.

In the server 30 in the example, the memory unit 33 corresponds to the memory unit in the server according to the present invention, the communication unit 31 corresponds to each of the reception units in the server according to the present invention, and the communication unit, the access unit 32 and the memory unit 33 correspond to the transmission unit in the server according to the present invention.

Likewise, the user terminal 40 is formed of a computer having various types of hardware resources with which the computer is made to run a program concerning the user terminal according to the present invention so that the respective functions of the user terminal according to the present invention can be implemented in and on the computer.

In the user terminal 40 in the example, the display unit 43 corresponds to the display unit in the user terminal according to the present invention, the reading unit 42 corresponds to the reading unit in the user terminal according to the present invention, and the communication unit 44 corresponds to the reception unit, the acquisition unit and the transmission unit in the user terminal according to the present invention.

These programs are introduced into the computers in the respective devices according to the present invention (display 10, server 30 and user terminal 40) in such a manner as to be introduced to each computer from an external memory medium such as a CD ROM in which the program is stored, or in such a manner as to be introduced to each computer from an external server that manages the program through a network line, for example.

The present invention is not limited to the above-described modes where the respective function units are implemented by means of software configuration and the respective function units may be implemented by dedicated hardware modules.

In addition, the configurations of the system and of the devices according to the present invention are not necessarily limited to those described above, and various configurations may be used.

For example, the configuration may allow a product information page that displays the information for describing the specification and functions of the product to be provided to a user as information on an item to be provided instead of a product selling page as described above. In addition, the information on an item to be provided may be information other than that concerning a product so that a user can access various types of pages that provide various types of information that correspond to the information displayed on the display 10 (for example, a coupon delivery site, a social network service site, a video delivery site, a music delivery site, a news site).

Furthermore, the system according to the present invention can be applied to private and home use instead of business use as described above.

Here, the above-described tag card 20 (hereinafter simply referred to as tag) can be used in a system according to another mode. In the following, other applications of a tag are described.

An example of a system can be cited such that an advertisement or a sample of a product (hereinafter referred to as advertised item) is exhibited in a store, and a user who saw the advertised item can allow the user terminal to read the tag ID of the tag that has been installed so as to be corresponded to the advertised item so that the product selling page of the desired product can be accessed by means of the user terminal for net shopping.

In the case where an employee of the store changes the exhibited advertised item to another product, the tag that has been installed for the advertised item before the change is installed so as to correspond to the advertised item after the change, and at this time, the URL of the product selling page held in the server so as to correspond to the tag ID is also changed. This changing of the URL can be achieved when the employee reads the tag ID from the corresponding tag using a portable terminal on hand and designates the URL after the change, and then transmits the tag ID and the URL after the change to the server from the terminal in such a manner that the tag ID and the URL are corresponded to each other. As a result, one tag can be used for a number of products. Here, various types of terminals including portable phones such as smart phones, tablets and mobile terminals can be used as the portable terminal in the same manner as the user terminal.

In the case where activation codes are held in the server so as to correspond to the individual tags and a management application in the server receives the tag ID of a tag that has not been activated from the portable terminal of an employee, for example, the employee may be encouraged to input an activation code into the portable terminal so that the inputted activation code can be compared to the activation code that had been held in advance, and the corresponding tag is activated in the case where these activation codes match, which can be used in the system afterwards. As a result, it is possible to prevent the management from overlapping.

In addition, the server may be allowed to count how often the respective tags are used (how often the product selling pages are accessed through the tags), for example, so that the management application can display the results, and thus, the state of use of each tag can be confirmed arbitrarily.

Though the selling of a product is cited as an example in the above-described application, the invention is not limited to this, and a user can access any of the various types of pages that provide information.

In addition, the invention can be applied not only to the business use as described above, but also to private and home use. That is to say, a tag is attached to a food material with a clip, and the server is allowed to manage the URL of a page that introduces a recipe that using the food material in such a manner that the URL is made to correspond to the tag. Thus, the correspondence between the tag and an arbitrary website can be provided without rewriting the tag.

In the case of personal use or home use, of course tags may be activated by means of the activation codes, and thus, the user (manager) of each tag can be limited to a particular person. In the case of personal use or home use, the server may count how often each tag is used so that the users can be provided with the results, and thus, each user can confirm the situation of how his or her tag is used.

Furthermore, the process to be carried out in the server on the basis of a tag may be changed depending on the device that has read the tag ID from the tag.

As a typical example, a tag that has recorded a tag ID is integrated into a card such as a membership card provided to a user of a store or an ID badge provided to a user of a facility. In the case where the tag ID is read by a reading device installed in the store or the facility, the server that receives the tag ID from the reading device carries out a process of recording the history of the usage of the store or the facility and a process of charging various types of fees (product fees or fees to use a facility). In the case where the tag ID is read by the portable terminal of the owner of a card, the server that receives the tag ID from the portable terminal carries out a process of transmitting to the portable terminal the URL of the webpage showing the history of use of the stores and the facilities concerning the tag ID and the state of money being charged. As a result, it becomes possible for the owner of the card to easily confirm the state of how the card is being used, which makes the card more useful.

In order to change the process by the server depending on the origin of the transmission of the tag ID (device that has read the tag ID), the processes carried out by the server upon the reception of a tag ID may be determined for each type of origin of the transmission of the tag ID (type of device or type of owner of the device, for example), the origin of the transmission of the tag ID may transmit its own type to the server together with the tag ID, and the server may determine the process by distinguishing the type of origin of the transmission of the tag ID.

Moreover, the server may manage the location information that indicates the location in which each tag is installed.

As a typical example, the server has a location management table where the tag IDs and the pieces of location information are made to correspond to each other as shown in FIG. 12. The user terminals are provided with a location information acquiring unit that acquires location information by using a GPS (global positioning system) so that the location information can be acquired at the point in time when the tag ID is read from a tag and transmitted to the server, and the location information can be transmitted to the server at the same time. Upon the reception of the tag ID and the location information from the user terminal, the server compares the location information corresponded to the received tag ID to the received location information. In the case where these pieces of location information are different (or there is an error that is a predetermined distance or greater), the planned operation (transmission of the URL, for example) is cancelled, and in other cases, the planned operation is carried out. As a result, it becomes possible to automatically stop the use of a tag in the case where the tag has been moved from the location of the tag that was originally assumed. Here, the location information may be the latitudinal and longitudinal information in a GPS or may be information in other expressions, and thus, any information that makes it possible to specify the location of a tag can be used as the location information.

In addition, the tag IDs and location information can be made to correspond to each other in advance so that information (temperature, time, facilities in the vicinity and amount of traffic in the place, and other information corresponding to the language that is mainly used) concerning the present locations (the locations in which tags are installed) can be dynamically displayed. In this case, information transmission is possible depending on the location even to a location where radio waves for the GPS do not reach, for example, and thus, information transmission depending on the location is made possible even to a user terminal that is not equipped with a specific device such as a GPS.

In the case where a tag ID is read from a tag by a user terminal, for example, the contents of the display on the user terminal may be changed depending on whether or not the dedicated management application has been started up on the user terminal.

As a typical example, in a case where a user terminal on which the dedicated management application that has not been started up reads a tag ID from a tag, the URL that corresponds to the tag ID is required from the server, and the URL received from the server is accessed to display the webpage. In the case where a user terminal in a state where the dedicated management application has been started up reads a tag ID from a tag, management information, such as of the state of use of the tag to which the tag ID is provided (frequency of use), the state of operation (in use or not), and the location information (location in which the tag is installed), is required from the server, and the management information received from the server is displayed. As a result, it becomes possible for the user who manages a tag to see the management information of the tag by simply allowing the user terminal on which the dedicated management application has been started up to read the tag.

In addition, the contents displayed on the user terminal that has read the tag ID from a tag may be of a language that corresponds to the setting of the language in the user terminal.

As a typical example, correspondence between the tag IDs, the identification information for each language and the URL of which the contents are displayed with the language is stored in the server. When a user terminal transmits to the server the tag ID that has been read from a tag and the identification information of the language that has been set as the language for the display on the user terminal, the server specifies the URL that corresponds to the identification information of the received language from among the URLs of which the contents are displayed in the language that are corresponded to the received tag ID and transmits the specified URL to the user terminal. As a result, information can be displayed on the user terminal in the language that corresponds to the language setting in the user terminal.

In the following, a technology for activating a tag using an authentication code such as an activation code shown in the above-described example of the application is described in detail.

Figure 7:
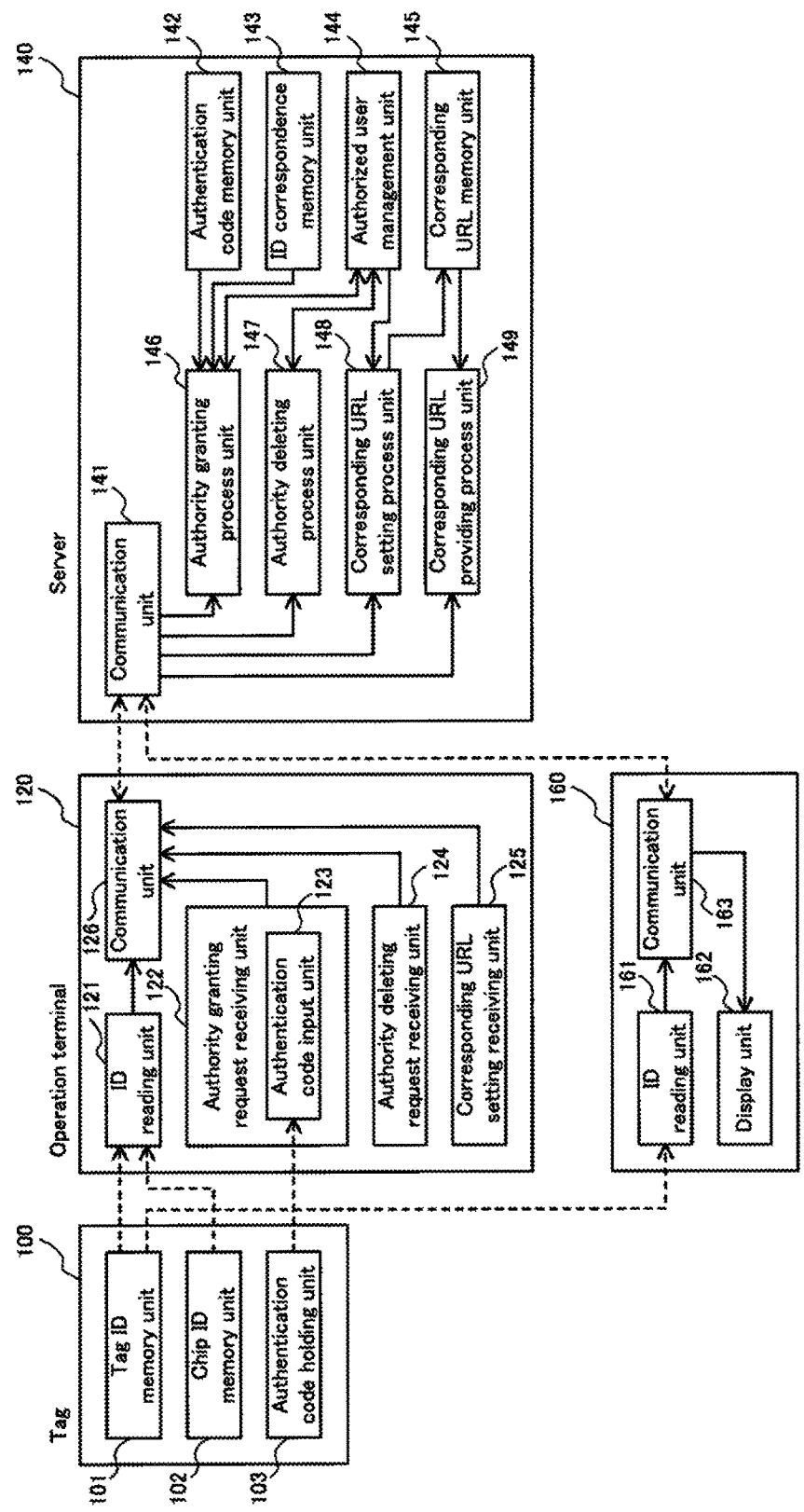
FIG. 7 is a diagram showing the function blocks in an example of the tag management system according to the present invention.

FIG. 7 shows a function block in an example of the tag management system according to the present invention.

The tag management system in the example is provided with a tag 100 that is corresponded to electronic information, an operation terminal 120 that is operated by a user concerning the correspondence of the electronic information, a server 140 that manages an authorized user who has the authority of corresponding electronic information, and a user terminal 160 that accesses the electronic information through the tag 100.

Here, various types of pages, images, videos, sounds, applications and the like on the web can be cited as examples of electronic information that is corresponded to the tag 100.

In addition, correspondence between the tag 100 and electronic information can be achieved by making the tag ID for identifying each tag 100 correspond to the URL that indicates the whereabouts of each piece of electronic information.

In the present system, it is assumed that the tag ID 100 is sold on the market. That is to say, a user purchases a required number of tags that are the same as the tag 100 and uses the operation terminal 120 so as to allow the server 140 to set the correspondence between the tags and the electronic information. As a result, the electronic information that is corresponded to the tag 100 can be provided to any user terminal 160 that has read the tag 100. Here, tags 100 may be distributed to the users of the present system for free.

This configuration is useful to easily construct such a product selling system that only advertisements and samples of products (hereinafter referred to as advertised items) are exhibited in stores, no products are actually sold in stores, and users who have seen advertised items are allowed to access product selling pages on the web for net shopping. In addition, a tag 100 that is corresponded to electronic information can be regarded as a physical bookmark corresponding to the electronic information, and therefore, the present system can be used not only in the product selling systems as described above, but also various types of environments such as in companies or at home.

The tag 100 is a compact electronic of which the operation is controlled by the built-in chip and has a chip ID memory unit 102 that stores the chip ID particular to the chip in addition to a tag ID memory unit 101 that stores the tag ID.

Figure 8:
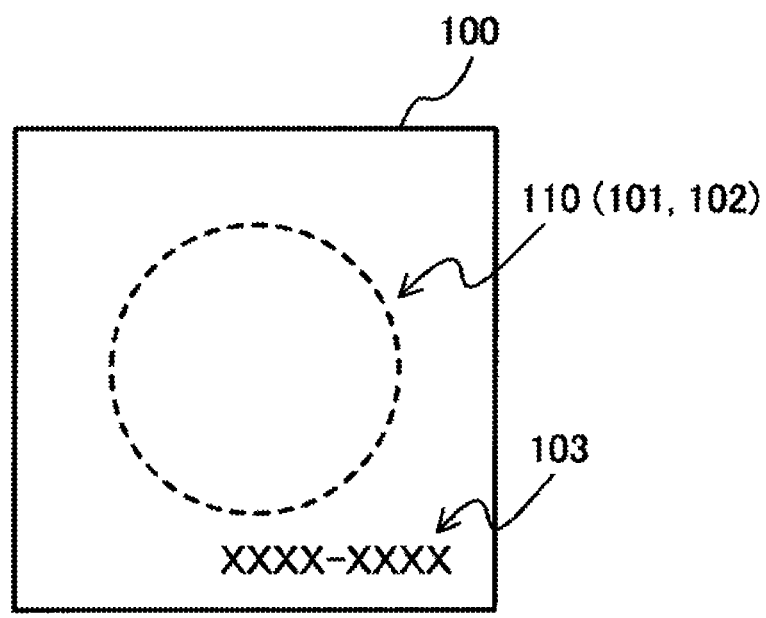
FIG. 8 is a diagram showing an example of a tag used in the tag management system in the example.

The tag 100 in the example has a chip 110 for NFC (near field communication) built in as shown in FIG. 8. Data access to the tag ID memory unit 101 and the chip ID memory unit 102 is controlled by the chip 110. Typically, the tag ID or the chip ID is transmitted to an external device for NFC (operation terminal 120 or user terminal 160) through noncontact communication in response to the external device being in proximity. Though the tag 100 in the example controls data access by using NFC, other communication standards may be used.

The chip ID is an ID particular to the chip that has been written in at the time when the chip 110 is manufactured in such a manner that it cannot be rewritten. The tag ID is an ID that has been uniquely provided and written in by the present system at the time of or after the manufacture of the tag 100 into which the chip 110 is incorporated. The tag is in such a state that only reading is possible, and it cannot be rewritten only by a person who has special authority.

The authentication code of the tag 100 is corresponded to the tag 100 in such a manner as to be recognizable by the user. The authentication code is also a code that is required to activate the tag 100 in such a state that the electronic information is corresponded to the tag 100, that is to say, in such a state as to be useable for access to the electronic information, and therefore may be referred to as an activation code.

Here, the chip ID and the authentication code are authentication information that is required in the case where the user requires the authorization of corresponding the electronic information to the tag 100 in the present system.

In the example, an authentication code holding unit 103 is provided in a portion on the surface of the tag 100, and an authentication code is printed in the authentication code holding unit 103. Therefore, the user can recognize the authentication code just by checking the tag 100. Here, a tag 100 may be sold or distributed by enclosing a sheet of paper on which an authentication code is printed in a product package, or an authentication code may be notified in accordance with another method such as the transmission of electronic data or mailing without being enclosed in a product package. In summary, the purchaser of a tag 100 can recognize the correspondence between the tag 100 and its authentication code.

The operation terminal 120 has an authority granting request receiving unit 122, an authority deleting request receiving unit 124 and a corresponding URL setting receiving unit 125 in order to be operated by a user concerning the correspondence of electronic information to the tag 100 in addition to an ID reading unit 121 that reads the ID from the tag 100, and a communication unit 126 that communicates with other devices (server 140 in the example).

Here, the operation terminal 120 can be implemented with a general portable terminal having an ID reading unit 121 and a communication unit 126 (portable phones including smart phones, tablets and other mobile terminals) without using a dedicated terminal having the above-described function units 121 through 126. That is to say, the respective functions of the authority granting request receiving unit 122, the authority deleting request receiving unit 124 and the corresponding URL setting receiving unit 125 may be provided to the terminal by allowing the terminal to log into the server 140 through the use of the user ID and the password that have been registered in advance, for example. The respective functions can be provided from the server 140 in this manner through a conventional web browser and a dedicated management application.

The authority granting request receiving unit 122 displays an authority granting request receiving window and receives an authority granting request that requires the granting of an authority to correspond electronic information to the tag 100 through this window.

The tag 100 to be a target of the authority granting request can be designated by allowing the operation terminal 120 to approach the tag 100 in a state where the authority granting request receiving window is displayed so that the ID reading unit 121 can read the tag ID and the chip ID. Alternatively, the operation terminal 120 is made to approach the tag 100 in advance so that the ID reading unit 121 can read the tag ID and the chip ID, and then, the authority granting request receiving window may be displayed.

A box in which the authentication code is to be inputted is provided on the authority granting request receiving window, and thus, it is necessary to input the authentication code of the targeted tag 100 into the box.

In addition, a transmission button is provided on the authority granting request receiving window, and thus, an authority granting request is transmitted to the server 140 when the transmission button is pressed down in a state where the tag ID and the chip ID have been read and the authentication code has been inputted. At this time, the tag ID and the chip ID that have been read by the ID reading unit 121 and the authentication code that has been inputted by the user are also transmitted to the server 140. That is to say, the operation terminal 120 transmits a chip ID and an authentication code to the server 140 as authentication information together with a request for granting an authority to correspond electronic information to a tag.

The authority deleting request receiving unit 124 displays an authority deleting request receiving window and receives an authority deleting request that requires the deletion of the authority to correspond electronic information to the tag 100 through this window.

The authority deleting request receiving window displays a list of tags 100 for which the user of the operation terminal 120 has the authority to correspond electronic information so that the tag 100 can be selected from among these. Here, a tag 100 can be selected in accordance with a technique of selection through clicking in the list or a technique of selection by allowing the ID reading unit 121 to read the tag ID.

A transmission button is provided on the authority deleting request receiving window in such a manner that an authority deleting request is transmitted to the server 140 when the transmission button is pressed down in a state where a tag 100 has been selected. At this time, the tag ID of the selected tag 100 is also transmitted to the server 140.

The corresponding URL setting receiving unit 125 receives a corresponding URL setting request that requires the correspondence of electronic information to a tag 100 through a corresponding URL setting window when this window is displayed.

The corresponding URL setting window displays a list of tags 100 for which the user of the operation terminal 120 has an authority to correspond electronic information so that the URL of the electronic information can be designated by selecting a tag 100 from among these. Here, a tag 100 can be selected in accordance with a technique of selection through clicking in the list or a technique of selection by allowing the ID reading unit 121 to read the tag ID. In addition, the URL of the electronic information can be designated in accordance with a technique of inputting the URL of the corresponding electronic information or a technique of selection from among the URLs that had been bookmarked in advance.

The corresponding URL setting window is provided with a transmission button in such a manner that a corresponding URL setting request is transmitted to the server 140 when the transmission button is pressed down in a state where the electronic information corresponded to the tag 100 has been designated. At this time, the combination of the tag ID of the selected tag 100 and the URL of the designated electronic information is also transmitted to the server 140.

The user terminal 160 has an ID reading unit 160 that reads the ID from a tag 100, a display unit 162 that outputs various types of information for display, and a communication unit 163 that communicates with other devices (server 140 in the example).

A general portable terminal (portable phones including smart phones, tablets and other mobile terminals) can be used as the user terminal 160.

When the user terminal 160 allows the ID reading unit 161 to read the tag ID from a tag 100, the user terminal 160 transmits the tag ID to the server 140 together with a corresponding URL providing request. Upon the reception of a URL from the server 140 in response to this, the user terminal 160 accesses the electronic information of the URL and outputs this for display on the display unit 162.

The server 140 has units for storing and managing various types of data concerning the correspondence of electronic information to a tag 100 and units for various types of processes in addition to a communication unit 141 that communicates with other devices (operation terminal 120 and user terminal 160 in the example).

The units for storing and managing various types of data concerning the correspondence of electronic information to a tag 100 include an authentication code memory unit 142 that stores the authentication code of each tag, an ID correspondence memory unit 143 that stores the correspondence between the tag IDs and the chip IDs, an authorized user management unit 144 that manages the authorized user of each tag, and a corresponding URL memory unit 145 that stores the correspondence between the tag IDs and the URLs. The memory and management units 142 through 145 can be implemented with a database constructed inside the server 140 or in an external memory device (hard disk, for example).

In the example, as shown in FIG. 9A, the authentication code memory unit 142 is formed of an authentication code management table where the tag IDs and the authentication codes are corresponded to each other. In addition, as shown in FIG. 9B, the ID correspondence memory unit 143 is formed of an ID correspondence management table where the tag IDs and the chip IDs are corresponded to each other. Furthermore, as shown in FIG. 9C, the authorized user management unit 144 is formed of an authorized user management table where the tag IDs and the user IDs are corresponded to each other. Moreover, as shown in FIG. 9D, the corresponding URL memory unit 145 is formed of a corresponding URL management table where the tag IDs and the URLs are corresponded to each other.

Various types of process units concerning the correspondence of electronic information to the tag 100 include an authority granting process unit 146 that carries out an authority granting process, an authority deleting process unit 147 that carries out an authority deleting process, a corresponding URL setting process unit 148 that carries out a corresponding URL setting process, and a corresponding URL providing process unit 149 that carries out a corresponding URL providing process. These process units 146 through 149 can be implemented by running the programs that prescribe the respective processes in the processor in the server 140.

The authority granting process unit 146 carries out an authority granting process in response to the reception of an authority granting request from the operation terminal 120.

Typically, the matching properties between the tag ID, the chip ID and the authentication code that have been received together with the authority granting request and the authorized user are first checked. In order to check the matching properties, whether or not the combination of the received tag ID and the authentication code matches the contents of the authentication code memory unit 142 is determined, and whether or not the combination of the received tag ID and the chip ID matches the contents of the ID correspondence memory unit 143 is determined. In order to check the authorized user, the non-existence (not being registered) of the authorized user for the received tag ID is determined in reference to the authorized user management unit 144. In the case where affirmative results are gained for all of these determinations, the user ID of the user of the operation terminal 120 is stored in (registered with) the authorized user management unit 144 in such a manner that the user ID is corresponded to the received tag ID, and thus, the authority of corresponding electronic information to the corresponding tag 100 is granted to the user of the operation terminal 120, and a response to the effect that the granting of the authority of corresponding electronic information has been successful is transmitted to the operation terminal 120. In the case where a negative result is gained for any of these determinations, the authority of corresponding electronic information to the corresponding tag 100 is not granted, and a response to the effect that the granting of the authority of corresponding electronic information has failed is transmitted to the operation terminal 120.

The authority deleting process unit 147 carries out an authority deleting process in response to the reception of an authority deleting request from the operation terminal 120.

Typically, the authorized user is first checked. In order to check the authorized user, whether or not the user of the operation terminal 120 has been registered as the authorized user of the received tag ID is determined in reference to the authorized user management unit 144. In the case where an affirmative result is gained in this determination, the user ID of the user of the operation terminal 120 that has been corresponded to the received tag ID is deleted from the authorized user management unit 144 so that the authority of corresponding electronic information to the corresponding tag 100 is deleted from the user of the operation terminal 120, and a response to the effect that the deletion of the authority of corresponding electronic information has been successful is transmitted to the operation terminal 120. In the case where a negative result is gained in the above-described determination, the authority of corresponding electronic information to the corresponding tag 100 is not deleted, and a response to the effect that the deletion of the authority of corresponding electronic information has failed is transmitted to the operation terminal 120.

The corresponding URL setting process unit 148 carries out a corresponding URL setting process in response to the reception of a corresponding URL setting request from the operation terminal 120.

Typically, the authority of correspondence of the user who has carried out a corresponding URL setting request is first checked. That is to say, whether or not the user of the operation terminal 120 is registered as the authorized user of the tag ID that has been received together with the corresponding URL setting request is determined in reference to the authorized user management unit 144. In the case where an affirmative result is gained in this determination, the URL that has been received together with the corresponding URL setting request is stored in the corresponding URL memory unit 145 in such a manner that the URL is corresponded to the received tag ID, and a response to the effect that the correspondence of electronic information has been successful is transmitted to the operation terminal 120. In the case where another URL has already been stored in such a manner as to be corresponded to the received tag ID, this URL is rewritten to the received URL. In the case where a negative result is gained in the above-described determination, a response to the effect that the correspondence of electronic information has failed is transmitted to the operation terminal 120.

Here, the user ID that was used by the user of the operation terminal 120 at the time of logging into the server 140 can be used as the user ID of the user of the operation terminal 120 in the authority granting process unit 146, the authority deleting process unit 147 and the corresponding URL setting process unit 148.

The corresponding URL providing process unit 149 carries out a corresponding URL providing process in response to the reception of a corresponding URL providing request from the user terminal 160.

Typically, the URL that is corresponded to the tag ID that has been received together with the corresponding URL providing request is read out from the corresponding URL memory unit 145 and transmitted to the user terminal 160 together with a corresponding URL providing response.

Figure 10:
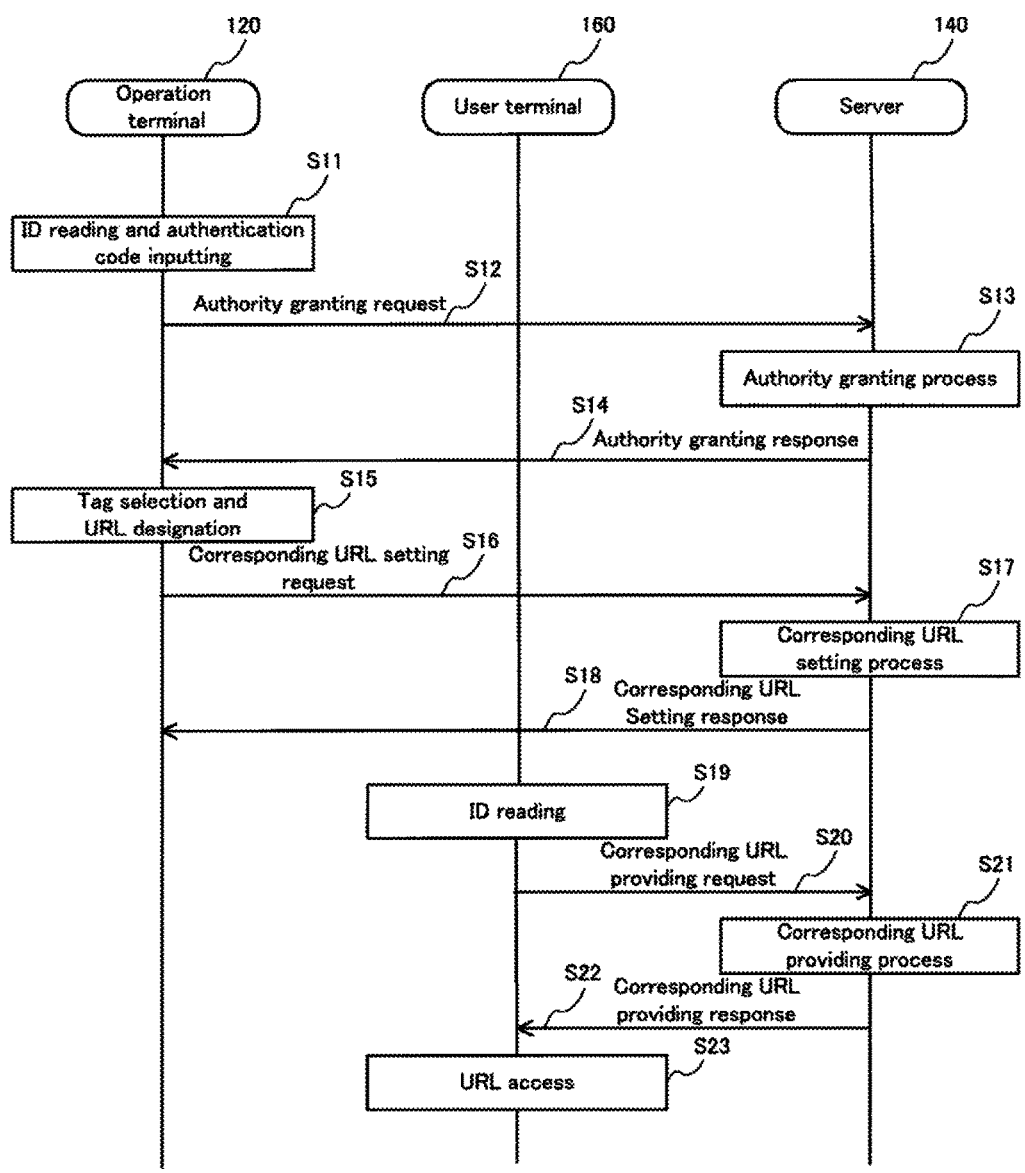
FIG. 10 is a diagram showing an example of the process flow in the tag management system in the example.

An example of a process flow in the tag management system in the example is described in reference to FIG. 10.

Here, a product selling system where advertised items instead of actual products are exhibited in a store and net shopping is possible on a product selling page that is accessible by means of a customer's user terminal 160 through tags 100 attached to the advertised items is cited as an example for description.

When the manager of the store acquires a required number of tags 100, the manager registers authorized users as follows prior to the correspondence of electronic information to these tags 100.

First, the manager's user ID and password are used on the operation terminal 120 so as to log into the server 140, where an authority granting request receiving window is called out, and the operation terminal 120 is made to approach a tag 100 so as to allow the ID reading unit 121 to read the tag ID and the chip ID, and at the same time allow the authentication code to be inputted into the authentication code input unit 123 (step S11). After that, the transmission button provided on the authority granting request receiving window is pressed down so that the authority granting request receiving unit 122 transmits an authority granting request to the server 140 together with the tag ID, the chip ID and the authentication code (step S12).

Upon reception of the authority granting request from the operation terminal 120, the server 140 allows the authority granting process unit 146 to carry out an authentication granting process on the basis of the tag ID, the chip ID and the authentication code that have been received together with the authority granting request (step S13).

In the authority granting process, whether or not the combination of the received tag ID and the authentication code is appropriate is first determined, whether or not the combination of the received tag ID and the chip ID is appropriate is determined, and the non-existence (not being registered) of the authorized user for the received tag ID is determined. In the case where affirmative results are gained for all of these determinations, the authority of corresponding electronic information to the corresponding tag 100 is granted to the user of the operation terminal 120. In the case where a negative result is gained for any of these determinations, the authority of corresponding electronic information to the corresponding tag 100 is not granted.

After that, the server 140 transmits an authority granting response that indicates the results of the authority granting process to the operation terminal 120 (step S14).

The manager of the store repeats the registration of an authorized user in steps S11 through S14 for all the tags 100 that are planned to be corresponded to electronic information for use.

After the completion of the registration of the authorized users in this manner, the manager of the store sets the corresponding URL as follows.

First, a corresponding URL setting window is called out on the operation terminal 120, and a tag 100 is selected and a URL is designated (step S15). After that, the transmission button provided on the corresponding URL setting window is pressed down so that the corresponding URL setting receiving unit 125 transmits a corresponding URL setting request to the server 140 together with the tag ID and the URL (step S16).

Upon reception of the corresponding URL setting request from the operation terminal 120, the server 140 allows the corresponding URL setting process unit 148 to carry out a corresponding URL setting process on the basis of the tag ID and the URL that have been received together with the corresponding URL setting request (step S17).

In the corresponding URL setting process, whether or not the user of the operation terminal 120 is registered as the authorized user of the received tag ID is first determined. In the case where an affirmative result is gained in this determination, the correspondence between the received tag ID and the URL is set. In the case where a negative result is gained in this determination, the correspondence between the received tag ID and the URL is not set.

After that, the server 140 transmits a corresponding URL setting response that indicates the results of the corresponding URL setting process to the operation terminal 120 (step S18).

The manager of the store repeats the setting of the corresponding URL in steps S15 through S18 for all the tags 100 that are planned to be corresponded to electronic information for use. In the case where the number of installed tags 100 is large, the load of the above-described task for all the tags 100 is large, and therefore, the tags 100 that have been collectively activated on the server 140 side may be prepared in advance and delivered to the manager of the store.

Thus, the tags 100 are installed so as to correspond to the corresponding advertised items in the store. Here, the tags 100 may be clipped to the advertised items, the tags 100 may be placed close to the advertised items, or the tag 100 may be installed in other ways such that the customers can understand the correspondence between the advertised items and the tags 100.

The customers who visit the store contemplates the purchase of a product when looking at the advertised item. In the case where a customer desires to purchase the product, the customer makes his or her user terminal 160 approach the tag 100 that is installed so as to correspond to the advertised item. As a result, the tag ID reading unit 161 in the user terminal 160 reads the tag ID (step S19), and a corresponding URL providing request is transmitted to the server 140 together with the tag ID (step S20).

Upon reception of the corresponding URL providing request from the user terminal 160, the server 140 allows the corresponding URL providing process unit 149 to carry out a corresponding URL providing process on the basis of the tag ID that has been received together with the corresponding URL providing request (step S21).

In the corresponding URL providing process, the URL of which the correspondence to the received tag ID has been set is transmitted to the user terminal 160 together with the corresponding URL providing response (step S22).

Upon reception of the URL from the server 140, the user terminal 160 accesses the product selling page of the URL, which is outputted on the display unit 162 as a display (step S23).

Thus, customers can simply make their own user terminals 160 approach the tag 100 that is installed so as to correspond to the advertised item of a desired product in order to access the product selling page of the product for net shopping.

Even in the case where a malicious user attempts to change the correspondence of electronic information to a tag 100, he or she cannot become a new authorized user unless the manager of the store deletes the registration of the authorized user for the tag 100, and therefore, the correspondence of electronic information to the tag 100 cannot be changed.

Figure 11:
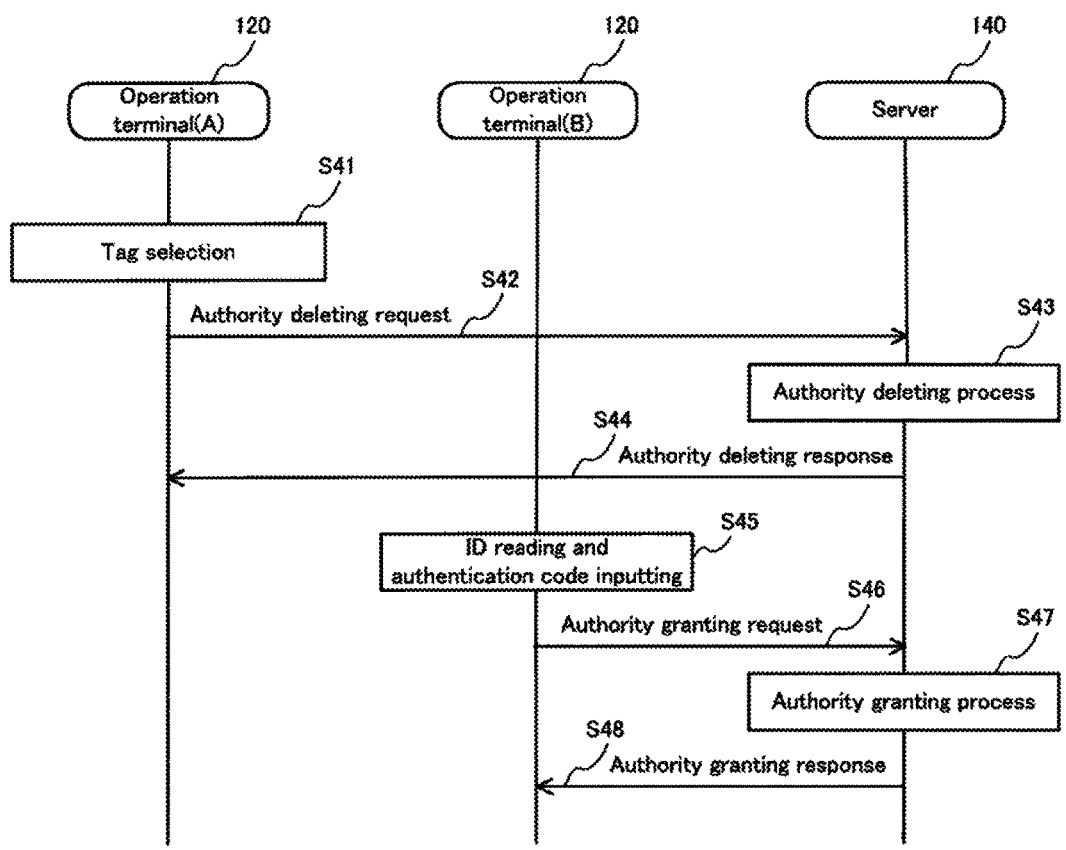
FIG. 11 is a diagram showing another example of the process flow in the tag management system in the example.

Next, another example of a process flow in the tag management system in the example is described in reference to FIG. 11.

Here, a case where a user A, who is an authorized user for a tag 100, turns over the tag 100 to a user B is described as an example. This could happen in the case where a tag 100 that has been used in a store that deals with certain types of products is used in a store that deals with other types of products. In the following, the operation terminal 100 of the user A is referred to as an operation terminal (A), and the operation terminal 100 of the user B is referred to as an operation terminal (B) in order to distinguish them.

In the tag management system in the example, a number of authorized users cannot be registered for the same tag 100, and therefore, it is necessary for user A to delete the registration as the authorized user for the tag 100 before turning the tag 100 over to user B.

Thus, user A first logs into the server 140 on the operation terminal (A) by using his or her own user ID and the password so as to call out a authority deleting request receiving window on which a targeted tag 100 is selected (step S41). After that, the transmission button provided on the authority deleting request receiving window is pressed down so as to allow the authority deleting request receiving unit 124 to transmit an authority deleting request to the server 140 together with the tag ID (step S42).

Upon reception of the authority deleting request from the operation terminal (A), the server 140 allows the authority deleting process unit 147 to carry out an authority deleting process on the basis of the tag ID that has been received together with the authority deleting request (step S43).

In the authority deleting process, whether or not user A, who is the user of the operation terminal (A), is registered as the authorized user of the received tag ID is first determined. In the case where an affirmative result is gained in this determination, the authority of corresponding electronic information to the corresponding tag 100 is deleted from user A. In the case where a negative result is gained in this determination, the authority of corresponding electronic information to the corresponding tag 100 is not deleted.

After that, the server 140 transmits an authority deleting response that indicates the results of the authority deleting process to the operation terminal (A) (step S44).

User A turns over the tag 100 to user B after the registration of the authorized user for the targeted tag 100 has been deleted in steps S41 through S44.

Upon reception of the tag 100 from user A, user B carries out registration as the authorized user prior to the correspondence of electronic information to the tag 100.

User B first logs into the server 140 on the operation terminal (B) by using his or her own user ID and the password so as to call out an authority granting request receiving window, and the operation terminal 120 is made to approach a tag 100 so as to allow the ID reading unit 121 to read the tag ID and the chip ID, and at the same time allow the authentication code to be inputted into the authentication code input unit 123 (step S45). After that, the transmission button provided on the authority granting request receiving window is pressed down so as to allow the authority granting request receiving unit 122 to transmit an authority granting request to the server 140 together with the tag ID, the chip ID and the authentication code (step S46).

Upon reception of the authority granting request from the operation terminal (B), the server 140 allows the authority granting process unit 146 to carry out an authority granting process on the basis of the tag ID, the chip ID and the authentication code that have been received together with the authority granting request (step S47).

After that, the server 140 transmits an authority granting response that indicates the results of the authority granting process to the operation terminal (B) (step S48).

As a result, user B becomes an authorized user for the tag 100 that has been turned over by user A, and thus can correspond electronic information to the tag 100.

As described above, in the tag management system in the example, the operation terminal 120 acquires the authentication information of a tag 100 (chip ID and authentication code) and transmits the authentication information to the server together with an authority granting request concerning the correspondence of electronic information to the tag when the authority granting request is received from the user. The server 140 has an ID correspondence memory unit 143 and an authentication code memory unit 142 that store the authentication information of each tag, and an authorized user management unit 144 that manages the authorized user of each tag. In the case where an authority granting request and authentication information are received from the operation terminal 120, the user of the operation terminal 120 is registered with the authorized user management unit 144 as an authorized user of the tag 100 in the configuration under such conditions that no authorized user is registered with the authorized user management unit 144 for the tag 100 concerning the authority granting request, and the received authentication information matches the contents of the ID correspondence memory unit 143 and the authentication code memory unit 142.

In this configuration, only the authorized user who has the authority of corresponding electronic information to the tag 100 can correspond electronic information to the tag 100, and in addition, other users cannot be an authorized user in the case where there is already an authorized user. Thus, the registration of a number of authorized users for a tag 100 can be avoided so that a corresponding process can be prevented from being carried out improperly on the tag 100 even in the case where another user can gain the authentication code of the tag 100 for which an authorized user already exists because the other user cannot gain the authority of corresponding electronic information.

In addition, in the tag management system in the example, the authentication information of a tag 100 includes the chip ID that is particular to the chip that controls the operation of the tag 100. Therefore, a chip ID is particular to a chip and cannot be rewritten even in the case where the tag ID that has been read out from a certain tag 100 is rewritten into another tag 100 to fabricate a copied tag because the tag 100 does not match the contents stored in the ID correspondence memory unit 143 in the server 140, which makes the copy incomplete, and the copier cannot become an authorized user for the copied tag 100. Accordingly, the correspondence cannot be changed with the copied tag 100, and thus, the electronic information corresponded to the copied tag 100 changes together with the change of the correspondence to the original tag 100. Therefore, in a case where the same electronic information is corresponded to a number of tags 100 for use, the correspondence to a certain tag 100 can be prevented from being changed without permission, and at the same time, such an effect can be gained that the correspondence to a number of tags 100 can be changed collectively.

In addition, in the tag management system in the example, the authentication information of a tag 100 includes an authentication code that has been corresponded to the tag 100 in advance in such a manner as to be recognizable by the user. Therefore, there are no problems with the installment of a tag 100 to which an authentication code is attached in such a manner as to be easily recognized in a place where an unspecified large number of people visit, such as stores or public places.

Unlike the tag management system in the example, it is not necessary to use both the chip ID and the authentication code as authentication information of a tag 100, and only one of them may be used. In the case where a tag is used on which a pattern image such as a one-dimensional bar code or a two-dimensional bar code that is gained by converting the tag ID to an image is printed or pasted, for example, it is preferable only for an authentication code to be used as authentication information. In the case where a tag in which the chip ID is stored as in the tag 100 in the example, the configuration may allow only the chip ID or only the authentication code to be used as authentication information.

Furthermore, in the tag management system in the example, the operation terminal 120 receives an authority deleting request concerning the correspondence of electronic information to a tag 100 from the user and transmits the authority deleting request to the server 140. In the case where the authority deleting request is received from the operation terminal 120, the server 140 deletes the authorized user of the tag from the authorized user management unit 144 in the configuration under such conditions that the user of the operation terminal 120 has been recorded as the authorized user of the tag concerning the authority deleting request.

In this configuration, the authorized user of the tag 100 can be changed to another user, and therefore, it is possible for a user who received a tag 100 to become a new authorized user, and thus, effective use of the tag 100 can be achieved.

Here, the number of authorized users who have an authority of corresponding electronic information to a tag 100 is not limited to just one. In the case where a number of users can be collectively managed as a user group, such a user group may be able to be set as an authorized user.

In the tag management system in the example, the server 140 is formed of a computer having hardware sources including: a CPU (central processing unit) that carries out various types of operations; a main memory unit such as a RAM (random access memory) that provides a region where the CPU works, and a ROM (read only memory) in which a basic control program is recorded; an auxiliary memory unit that stores various types of programs and data; a display unit on which various types of information is outputted for display; an input/output I/F that is an interface with an input apparatus such as operation buttons and a touch panel that are used for the input operation by a user; and a communication I/F, which is an interface for wire or wireless communication vis-à-vis other devices.

Thus, the programs concerning the server according to the present invention are run in a computer so that the respective functions of the server according to the present invention are implemented on the computer.

In the server 140 in the example, the authentication code memory unit 142 corresponds to the authentication code memory unit according to the present invention, the authorized user management unit 144 corresponds to the authorized user management unit according to the present invention, the ID correspondence memory unit 143 corresponds to the ID correspondence memory unit according to the present invention, the authority granting process unit 146 corresponds to the authority granting unit according to the present invention, and the authority deleting process unit 147 corresponds to the authority deleting unit according to the present invention.

In the same manner, the operation terminal 120 and the user terminal 160 are formed of a computer provided with various types of hardware resources.

In the operation terminal 120 in the example, the ID reading unit 121 corresponds to the ID reading unit according to the present invention, the authority granting request receiving unit 122 corresponds to the authority granting request unit according to the present invention, and the authority deleting request receiving unit 124 corresponds to the authority deleting request unit according to the present invention.

Here, the present invention is not limited to the above-described mode where the respective function units are implemented in the software configuration, but the respective function units may be implemented in dedicated hardware modules.

In addition, the configurations of the system or the devices according to the present invention are not necessarily limited to the ones described above, and various modifications may be applied. Furthermore, various types of embodiments and modifications shown in the present specification can be combined arbitrarily. For example, tags used in the product selling system that is described in reference to FIG. 1 (an example of the information provision system according to the present invention) may be activated by using authentication codes in the same manner as in the above-described tag management system.

Moreover, the above-described authentication code may be used as a pass code for acquiring information with a certain string attached to a tag 100. That is to say, the user terminal 160 receives an input of the authentication code of the tag 100 from the user when the tag ID is read from the tag 100 and transmitted to the server 140, and transmits the inputted authentication code to the server 140 in the case where the authentication code has been inputted. The server 140 transmits the URL that is corresponded to the tag ID to the user terminal 160 in the case where only the tag ID is received from the user terminal 160. In the case where an authentication code is received from the user terminal 160 together with the tag ID, whether or not the combination of the received tag ID and the authentication code is appropriate is determined. In the case where an affirmative result is gained in this determination, information with a certain string attached to the tag ID is transmitted to the user terminal 160 in place of the URL that is corresponded to the tag ID. As a result, a diversity of information accessible through tags can be increased. For example, the authentication code used at the time of activation can be managed as information that can be known only to the authorized user so that the authorized user can be recognized through the input of the authentication code and can be provided with information that is not disclosed to the public, such as the state of use and management of the tag. In addition, the authentication code used at the time of activation can be shared with a specific user or user group so that only the specific user or user group can share and peruse secret information. In the case where an authentication code is used for such an application, the authentication code may be recognizable to the authorized user with a medium different from the tag 100 (printed material enclosed in the product package, printed material mailed separately, electronic mail or the like) instead of printing the authentication code directly onto the tag 100 so that a person who is not an authorized user cannot understand the authentication code.

INDUSTRIAL APPLICABILITY

The present invention can be applied to a product information provision system in various forms where information introduced through the image on a display is provided to a user by means of a user terminal.

In addition, the present invention can be applied to a tag management system in various forms where the correspondence of electronic information to a tag is managed.

REFERENCE SIGNS LIST

10: display
11: display unit
12: selection recognition unit
13: memory unit
14: communication unit
20: tag card
21: memory unit
30: server
31: communication unit
32: access unit
33: memory unit
40: user terminal
41: operation unit
42: reading unit
43: display unit
44: communication unit
50: product selling site
100: tag
101: tag ID memory unit
102: chip ID memory unit
103: authentication code holding unit
120: operation terminal
121: ID reading unit
122: authority granting request receiving unit
123: authentication code inputting unit
124: authority deleting request receiving unit
125: corresponding URL setting request receiving unit
126: communication unit
140: server
141: communication unit
142: authentication code memory unit
143: ID correspondence memory unit
144: authorized user management unit
145: corresponding URL memory unit
146: authority granting process unit
147: authority deleting process unit
148: corresponding URL setting process unit
149: corresponding URL providing process unit
160: user terminal
161: ID reading unit
162: display unit
163: communication unit

The invention claimed is:

1. An information provision system, comprising: a display that displays contents indicating information of an object to be provided; a tag installed so as to correspond to a single display; a server that manages a URL for the information of the object to be provided; and a user terminal that displays the information of the object to be provided on a basis of the URL, characterized in that:

said tag has a memory unit that stores a tag ID in such a manner as to be readable by said user terminal, said display has: a memory unit that stores a display ID uniquely corresponded to the tag ID stored in said tag; a display unit that displays the contents indicating information of the object to be provided; a selection recognition unit that recognizes a selection by a user for the displayed contents by detecting a specific operation for said display; and a transmission software/hardware interface that transmits the display ID to said server through a network in response to the recognition of the selection, said user terminal has: a reading unit that reads the tag ID from said tag by using communication with said tag or by using analysis of an image of said tag; a transmission software/hardware interface that transmits the read tag ID to said server through the network; a reception software/hardware interface that receives the URL from said server through the network; an acquisition software/hardware interface that acquires the information of the object to be provided on a basis of the received URL, through the network; and a display unit that displays the acquired information of the object to be provided, and said server has: a memory unit that stores the display ID and the URL that correspond to each other; a reception software/hardware interface that receives the display ID from said display through the network; a reception software/hardware interface that receives the tag ID from said user terminal through the network, and a transmission software/hardware interface that responds to the reception of the display ID from said display and to the reception of the tag ID uniquely corresponding to the display ID from said user terminal, and that transmits the URL corresponding to the display ID stored in the memory unit of said server to said user terminal through the network.

2. The information provision system according to claim 1, characterized in that said display stores as the display ID the tag ID that is stored by the memory unit in said tag, and as a result, the display ID and the tag ID uniquely correspond to each other.

3. The information provision system according to claim 1, characterized in that said server stores information for allowing the display ID and the tag ID to uniquely correspond to each other, and the display ID and the tag ID uniquely correspond to each other on a basis of the stored information.

4. The information provision system according to claim 1, characterized in that in said display, said display unit displays a number of pieces of contents, said selection recognition unit recognizes a selection of any piece of displayed contents by the user, and said transmission software/hardware interface transmits an ID of the selected piece of displayed contents in association with the display ID to said server, and in said server, said memory unit stores an ID of each piece of contents displayed on said display which corresponds to the display ID and the URL for the information of the object to be provided concerning the displayed contents in such a manner that the ID of each piece of contents and the URL correspond to the display ID, said reception software/hardware interface receives the ID of the selected piece of the displayed contents from said display in addition to the display ID, and said transmission software/hardware interface transmits the URL that corresponds to the received ID of the displayed contents to said user terminal.

5. The information provision system according to claim 1, characterized in that a display that is the same as said display and a tag that is the same as said tag are installed in a number of different locations, and the respective displays are connected to said server through the network.

6. The information provision system according to claim 1, characterized in that said server stores the contents indicating the information of the object to be provided and transmits the stored contents to said display, and said display acquires the contents indicating the information of the object to be provided from said server and displays the acquired contents.

7. The information provision system according to claim 1, characterized in that in said display, said display unit switches contents to be displayed as time elapses, and said selection recognition unit recognizes the switching of the displayed contents as a tacit selection.

8. A server used in an information provision system, wherein the information provision system includes a display that displays contents indicating information of an object to be provided; a tag installed so as to correspond to a single display; and a user terminal that displays the information of the object to be provided on a basis of a URL, characterized in that:

said tag has a memory unit that stores a tag ID in such a manner as to be readable by said user terminal, said display has: a memory unit that stores a display ID uniquely corresponded to the tag ID stored in said tag; a display unit that displays the contents indicating the information of the object to be provided; a selection recognition unit that recognizes a selection by a user for the displayed contents by detecting a specific operation for said display; and a transmission software/hardware interface that transmits the display ID to said server through a network in response to the recognition of the selection, and said user terminal has: a reading unit that reads the tag ID from said tag by using communication with said tag or by using analysis of an image of said tag; a transmission software/hardware interface that transmits the read tag ID to said server through the network; a reception software/hardware interface that receives the URL from said server through the network; an acquisition software/hardware interface that acquires the information of the object to be provided on a basis of the received URL, through the network; and a display unit that displays the acquired information of the object to be provided, said server comprising: a memory unit that stores the display ID and the URL that correspond to each other; a reception software/hardware interface that receives a the display ID from said display through the network; a reception software/hardware interface that receives the tag ID from said user terminal through the network; and a transmission software/hardware interface that responds to the reception of the display ID from said display and the reception of the tag ID uniquely corresponded to the display ID from said user terminal, and transmits the URL corresponded to the display ID stored in the memory unit of said server to said user terminal through the network.

9. An information provision method implemented by using: a display that displays contents indicating information of an object to be provided; a tag installed so as to correspond to a single display; a server that manages the URL for the information of the object to be provided; and a user terminal that displays the information of the object to be provided on a basis of the URL, characterized in that:

said tag stores a tag ID in such a manner as to be readable by said user terminal, said display stores a display ID uniquely corresponded to the tag ID stored in said tag, said server stores the display ID and the URL that correspond to each other, said display transmits the display ID to said server through a network in response to a selection by a user for displayed contents indicating the information of the object to be provided, by detecting a specific operation for said display, said user terminal transmits the tag ID which is read from said tag by using communication with said tag or by using analysis of an image of said tag, to said server through the network, said server responds to reception of the display ID from said display and reception of the tag ID uniquely corresponded to the display ID from said user terminal, and transmits the URL corresponded to the display ID stored in said server to said user terminal through the network, and said user terminal acquires the information of the object to be provided on a basis of the URL received from said server through the network and displays the acquired information of the object to be provided.

* * * * *